US009767459B1

(12) United States Patent
Teplinsky et al.

(10) Patent No.: US 9,767,459 B1
(45) Date of Patent: Sep. 19, 2017

(54) DETECTION OF COUNTERFEIT ELECTRONIC ITEMS

(71) Applicant: Optimal Plus Ltd., Holon (IL)

(72) Inventors: Shaul Teplinsky, San Francisco, CA (US); Dan Sebban, Rishon LeZion (IL); Bruce Alan Phillips, Jerusalem (IL)

(73) Assignee: OPTIMAL PLUS LTD., Holon (IL)

( * ) Notice: Subject to any disclaimer, the term of this patent is extended or adjusted under 35 U.S.C. 154(b) by 0 days.

(21) Appl. No.: 15/069,284

(22) Filed: Mar. 14, 2016

(51) Int. Cl.
*H04L 29/06* (2006.01)
*G06Q 30/00* (2012.01)

(52) U.S. Cl.
CPC .............................. *G06Q 30/0185* (2013.01)

(58) Field of Classification Search
CPC ................................. G06F 21/73; G06F 21/44
See application file for complete search history.

(56) References Cited

U.S. PATENT DOCUMENTS

| 7,529,695 | B2 | 5/2009 | Yang et al. | |
|---|---|---|---|---|
| 7,777,515 | B2 | 8/2010 | Balog | |
| 8,781,773 | B2 | 7/2014 | Gurov et al. | |
| 2012/0187185 | A1* | 7/2012 | Sayan | G06Q 30/0601 235/375 |
| 2012/0226463 | A1* | 9/2012 | Keller, III | H01L 23/576 702/117 |
| 2015/0219714 | A1 | 8/2015 | Hamilton et al. | |
| 2016/0169818 | A1* | 6/2016 | Martin | G01N 23/223 702/81 |

FOREIGN PATENT DOCUMENTS

| EP | 2065849 A1 | 6/2009 |
|---|---|---|
| WO | 2013063393 A1 | 5/2013 |
| WO | 2013123170 A1 | 8/2013 |

OTHER PUBLICATIONS

Hennek, Jonathan W., et al. "Using Magnetic Levitation for Non-Destructive Quality Control of Plastic Parts." Advanced Materials 27.9 (2015):1587-1592.

(Continued)

*Primary Examiner* — Jason K Gee
(74) *Attorney, Agent, or Firm* — Browdy and Neimark, PLLC

(57) ABSTRACT

Disclosed are methods, systems and computer program products where an item may or may not be determined as counterfeit based on result(s) of a comparison between test data for the item, and test data for items that are associated with manufacturing data in the cluster that is most likely to include manufacturing data that is associated with attribute data obtained for the item. In some embodiments, such methods, systems and computer program products may allow automated, universal non-destructive, and/or non-invasive detection of counterfeit electronic items. In some embodiments, counterfeit detection may be integrated into existing supply chains, including high volume manufacturing supply chains, and may be performed for a large variety of items without a need for a major adjustment to manufacturing. However, the counterfeit detection in some embodiments may not necessarily be integrated into manufacturing and may occur at any time, even when an item is in use.

30 Claims, 2 Drawing Sheets

(56) References Cited

OTHER PUBLICATIONS

D. Forte, M. Tehranipoor, "Test Opportunities and Challenges for Secure Hardware and Verifying Trust in Integrated Circuits", presented in International Test Conference, Oct. 6-8, 2015 (p. 6 of advanaced program).
Pihlaja, Douglas. "Real Time Dynamic Application of Part Average Testing (PAT) at Final Test." CS ManTech Tech. Dig (2013): 165-167.
Helfmeier, Clemens, et al. "Cloning physically unclonable functions."Hardware-Oriented Security and Trust (HOST), 2013 IEEE International Symposium on. IEEE, 2013.
https://hana.sap.com/content/dam/website/saphana/en—us/PDFs/suiteonhanafactbooks/32758_GB_28550_6SCM_en.pdf (Aug. 24, 2015).
http://www.oracle.com/us/products/applications/ebusiness/scm/062084.pdf (2006).
http://verayo.com/tech.php (Oct. 26, 2015).
https://www.intrinsic-id.com/products/quiddikey/quiddicard/ (Nov. 27, 2015).
http://www.microsemi.com/document-portal/doc_view/132851-securing-your-supply-chain-life-cycle (Nov. 2013).
http://blog.nxp.com/identification/puf-breathing-new-life-into-smart-card-security-2 (May 29, 2013).
http://www.intel.com/newsroom/kits/isscc/2014/pdfs/Intel_Labs_Energy_Efficiency_Research.pdf (Nov. 18, 2015).
http://www.nokomisinc.com/about.html (Oct. 12, 2015).
http://www8.hp.com/us/en/software-solutions/product-authentication-anti-counterfeit-services/ (Oct. 5, 2015).
https://en.wikipedia.org/wiki/High-integrity_pressure_protection_system (Dec. 23, 2015).
https://en.wikipedia.org/wiki/Mahalanobis_distance (Dec. 30, 2015).
http://www.edn.com/design/characterization/4394912/2/Electrical-testing-to-detect-counterfeit-components (Aug. 28, 2012).
https://en.wikipedia.org/wiki/Counterfeit_electronic_components (Jan. 10, 2016).
https://en.wikipedia.org/wiki/Authentication (Jan. 10, 2016).
https://en.wikipedia.org/wiki/Principal_component_analysis (Jan. 10, 2016).
Jolliffe, Ian. Principal component analysis. John Wiley & Sons, Ltd, 2002.
Saul, Lawrence K., et al. "Spectral methods for dimensionality reduction." Semisupervised learning (2006): 293-308.
Daszykowski, Michal, et al. "Robust statistics in data analysis—a review: basic concepts." Chemometrics and Intelligent laboratory systems 85.2 (2007): 203-219.
Hubert, Mia, Peter J. Rousseeuw, and Stefan Van Aelst. "High-breakdown robust multivariate methods." Statistical Science (2008): 92-119.
http://www.webopedia.com/TERM/A/authentication.html (Feb. 11, 2016).
http://searchsecurity.techtarget.com/definition/authentication (Feb. 11, 2016).
https://en.wikipedia.org/wiki/Orthogonalization (Feb. 28, 2016).
https://en.wikipedia.org/wiki/Cluster_analysis (Jan. 10, 2016).

* cited by examiner

DETECTION OF COUNTERFEIT ELECTRONIC ITEMS

TECHNICAL FIELD

The disclosure relates to the field of counterfeit electronic items.

BACKGROUND

When an electronic item is counterfeit, an incorrect assumption may be made about a counterfeit electronic item regarding, e.g. the origins and/or quality of the item. In some worse cases, where a counterfeit item has inferior specifications and quality compared to what is assumed, the counterfeit item may cause a hazard if incorporated into critical systems such as aircraft navigation, life support, military equipment, or space vehicles. Even when not hazardous, counterfeiting of electronic items may be an infringement of the legitimate producer's trademark rights. Some examples of counterfeiting techniques discussed in https://en.wikipedia.org/wiki/Counterfeit_electronic_components may include: non-functional items, sanding & remarking, blacktopping & remarking, device substitution, die salvaging, manufacturing rejects, component lead re-attachment, relabeling boxes, items whose hardware or software have been altered or tampered with by an unauthorized party, etc.

Now that the manufacturing of electronic items has been commoditized, it has become easier for a counterfeiter to introduce counterfeit items (which may be substandard) into the supply chain. Dispersed and fragmented electronics supply chains may be built on outsourced fabrication (Fabless Model) and/or outsourced testing and may comprise multiple members such as Original Design Manufacturers (ODMs), Original Component Manufacturers (OCMs), resellers, distributors and/or end-users, etc. Such supply chains may be susceptible to injection of counterfeit items, as a counterfeit item may be injected into a supply chain by or via any of its members. Counterfeit items may be injected, for example, individually as part of legitimate batches, or may be inserted, for example by way of one or more completely counterfeit batches. A supply chain member that in possession of an item and/or that is responsible for fabricating and/or testing say another item that includes the item may not always be interested in detecting that the item is counterfeit.

As the producers of counterfeit electronic items become more sophisticated in production methods, it has become more difficult to detect counterfeit items.

Existing approaches for detecting counterfeits electronic items may include the following:

In a first approach, a (unique) unit-level ID is embedded in or attached to the item. This ID may be read and validated at one or more points along the supply chain in order to authenticate the item. In the semiconductor industry, an example of such a unit-level ID may be an Electronic Chip ID (ECID) that is embedded into the item during fabrication of the item.

In a second approach, unit level test data may be collected for an item along the supply chain as well as outside the chain and compared to test data previously collected for the item and/or to recorded registration data for the item. Typically, this approach utilizes some form of a Physically Unclonable Function (PUF) and is based on collecting and comparing the PUF's response for the same item. Typically, such a function may be selected because the response of the function remains stable along manufacturing flow(s) of the item and therefore it may consistently be compared to the same initial registration response.

In a third approach, result(s) of a single test or a full suite of tests on an item may be collected and compared to result(s) of the same test or suite of tests collected for a single item known to not be counterfeit.

SUMMARY

According to one aspect of the presently disclosed subject matter, there is provided a counterfeit detection system, comprising at least one processor, the at least one processor configured to: provide second attribute data that is based on first attribute data obtained for a first electronic item; obtain manufacturing data, associated with the second attribute data, wherein obtained manufacturing data includes at least some fabrication data; cluster obtained manufacturing data into one or more clusters; select a cluster from the one or more clusters that is most likely to include obtained manufacturing data that is associated with obtained first attribute data; obtain first test data for the first item, relating to a plurality of tests of the first item; obtain second test data for second electronic items associated with manufacturing data in the cluster, the second test data relating to second tests of the second items, and the second tests comprising tests that are identical to the first plurality of tests, or tests that are comparable to the first plurality of tests, or both; compare the first test data to the second test data; determine whether or not the first item is counterfeit, based on at least one result of the comparing; and perform at least one act consequent to the determining.

In addition to the above features, the system according to this aspect of the presently disclosed subject matter may comprise one or more of features (i) to (xxvii) listed below, in any desired combination or permutation which is technically possible.

(i) the system further comprises at least one database, wherein at least some obtained manufacturing data is obtained from the at least one database.

(ii) at least some of at least one of: the first test data or the second test data is obtained from the at least one database.

(iii) the system further comprises at least one tester, wherein the at least one processor is included in at least one of: at least one computing part of at least one of the at least one tester, or at least one computer that is not part of any tester.

(iv) at least some of at least one of: the first test data or the second test data is obtained from the at least one tester.

(v) the at least one tester includes at least one manufacturing tester.

(vi) being configured to determine includes being configured to determine while the first item, or another item including the first item, is electrically coupled to at least one of the at least one manufacturing tester during manufacturing.

(vii) the at least one tester includes at least one of: at least one Built In Self Test structure for in-use testing or at least one similar test structure for in-use testing.

(viii) being configured to select includes being configured to look up unique attribute data in one or more groups of attribute data respectively associated with the one or more clusters, in order to determine which group includes the unique attribute data, and thereby determine that the associated cluster is most likely to include obtained manufacturing data that is associated with obtained first attribute data, wherein the unique attribute data includes at least one of: obtained first attribute data that uniquely identifies a single item or attribute data traced from obtained first attribute data that uniquely identifies a single item.

(ix) being configured to cluster includes being configured to develop a statistical model for the clustering, and being configured to select includes being configured to apply the statistical model to obtained manufacturing data associated with obtained first attribute data.

(x) at least one of: being configured to obtain first test data or being configured to obtain second test data, includes being configured to adjust for variation in test conditions at least one of: at least some of the first test data or at least some of the second test data.

(xi) the first test data and the second test data both include only passing test data.

(xii) obtained manufacturing data includes critical manufacturing data.

(xiii) obtained manufacturing data includes all obtainable manufacturing data associated with the second attribute data.

(xiv) if a quantity of the second items is below a threshold, the at least one processor is further configured to repeat clustering with larger cluster sizes until the threshold is met.

(xv) at least one of: being configured to obtain first test data or being configured to obtain second test data, includes being configured to adjust at least one of: at least some of the first test data or at least some of the second test data, based on a known relationship between manufacturing data that is different in the cluster and the first test data or the second test data.

(xvi) being configured to compare includes being configured to perform a multivariate outlier detection.

(xvii) being configured to perform a multivariate outlier detection includes being configured to calculate a Mahalanobis distance between the first test data and the second test data.

(xviii) being configured to determine includes being configured to compare the distance to a threshold.

(xix) being configured to determine includes being configured to compare the distance to a historical baseline.

(xx) being configured to compare includes being configured to reduce a dimensionality of the second test data and the first test data.

(xxi) the plurality of tests includes at least one of: all of the tests performed during at least one testing sub-step, or all of the tests performed during at least one in-use testing instance.

(xxii) the first test data includes critical test data.

(xxiii) the first test data includes at least one of: test results, virtual test data, or test meta data.

(xxiv) obtained first attribute data includes attribute data that uniquely identifies a single item.

(xxv) obtained first attribute data is based on incoming batch information.

(xxvi) being configured to perform at least one act includes at least one of: being configured to perform or being configured to initiate at least one workflow modification.

(xxvii) the at least one processor is further configured to trace data.

According to another aspect of the presently disclosed subject matter there is provided a method of counterfeit detection, comprising: providing second attribute data that is based on first attribute data obtained for a first electronic item; obtaining manufacturing data, associated with the second attribute data, wherein obtained manufacturing data includes at least some fabrication data; clustering obtained manufacturing data into one or more clusters; selecting a cluster from the one or more clusters that is most likely to include obtained manufacturing data that is associated with obtained first attribute data; obtaining first test data for the first item, relating to a plurality of tests of the first item; obtaining second test data for second electronic items associated with manufacturing data in the cluster, the second test data relating to second tests of the second items, and the second tests comprising tests that are identical to the first plurality of tests, or tests that are comparable to the first plurality of tests, or both; comparing the first test data to the second test data; determining whether or not the first item is counterfeit, based on at least one result of the comparing; and performing at least one act consequent to the determining.

This aspect of the disclosed subject matter may comprise one or more of features (i) to (xxvii) listed above with respect to the system, mutatis mutandis, in any desired combination or permutation which is technically possible.

According to another aspect of the presently disclosed subject matter there is provided a computer readable medium having a computer readable program code embodied therein, the computer readable program code adapted to be executed to perform a method of counterfeit detection, comprising: providing second attribute data that is based on first attribute data obtained for a first electronic item; obtaining manufacturing data, associated with the second attribute data, wherein obtained manufacturing data includes at least some fabrication data; clustering obtained manufacturing data into one or more clusters; selecting a cluster from the one or more clusters that is most likely to include obtained manufacturing data that is associated with obtained first attribute data; obtaining first test data for the first item, relating to a plurality of tests of the first item; obtaining second test data for second electronic items associated with manufacturing data in the cluster, the second test data relating to second tests of the second items, and the second tests comprising tests that are identical to the first plurality of tests, or tests that are comparable to the first plurality of tests, or both; comparing the first test data to the second test data; determining whether or not the first item is counterfeit, based on at least one result of the comparing; and performing at least one act consequent to the determining.

This aspect of the disclosed subject matter may comprise one or more of features (i) to (xxvii) listed above with respect to the system, mutatis mutandis, in any desired combination or permutation which is technically possible.

BRIEF DESCRIPTION OF THE DRAWINGS

In order to understand the subject matter and to see how it may be carried out in practice, some examples will be described, with reference to the accompanying drawings, in which.

Figure 1:
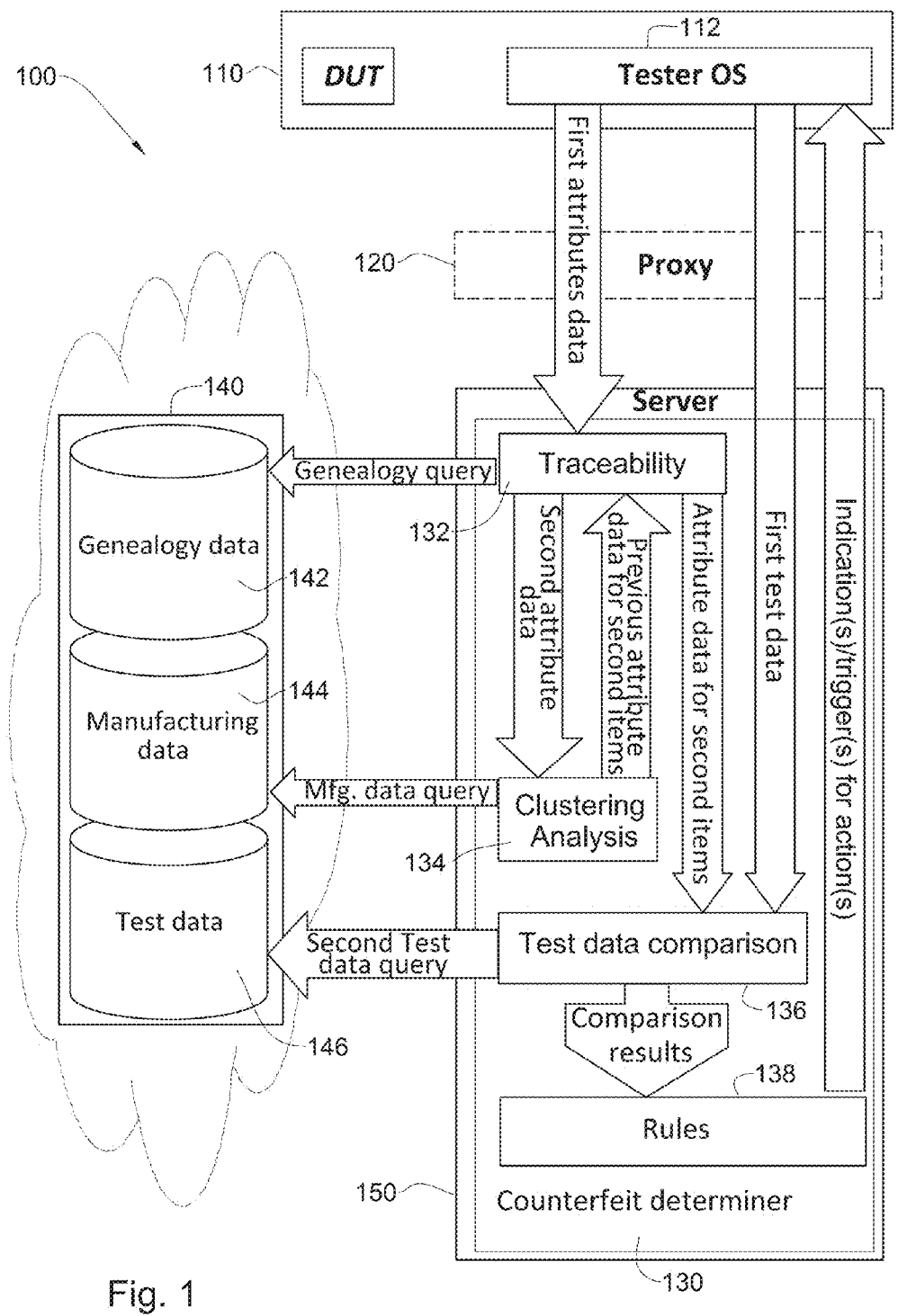
FIG. 1 is a block diagram of a counterfeit detection system, in accordance with some embodiments of the presently disclosed subject matter.

It will be appreciated that for simplicity and clarity of illustration, elements shown in the figures have not necessarily been drawn to scale. For example, the dimensions of

DETAILED DESCRIPTION

Some embodiments of the presently disclosed subject matter disclose methods, systems and computer program products where an item may or may not be determined as counterfeit based on result(s) of a comparison between test data for the item, and test data for items that are associated with manufacturing data in the cluster that is most likely to include manufacturing data that is associated with attribute data obtained for the item. In some of these embodiments, such methods, systems and computer program products may allow automated, universal non-destructive, and/or non-invasive detection of counterfeit electronic items. In some of these embodiments, counterfeit detection may be integrated into existing supply chains, including high volume manufacturing supply chains, and may be performed for a large variety of items without a need for a major adjustment to manufacturing. However, the counterfeit detection in some of these embodiments may not necessarily be integrated into manufacturing and may occur at any time, even when an item is in use.

In the description herein, numerous specific details are set forth in order to provide a thorough understanding of the subject matter. However, it will be understood by those skilled in the art that some examples of the subject matter may be practiced without these specific details. In other instances, well-known feature(s), structure(s), characteristic(s), stage(s), action(s), process(es), function(s), functionality/ies, procedure(s), method(s), element(s), entity/ies and/or system(s) have not been described in detail so as not to obscure the subject matter.

Usage of the terms "typically although not necessarily", "not necessarily so", "such as", "e.g.", "possibly", "potentially", "it is possible", "it is possible", "it is plausible", "optionally", "say", "for example," "for instance", "an example" "one example", "illustrated example", "illustrative example", "some examples", "another example", "other examples, "various examples", "these examples", "examples", "some embodiments", "some of these embodiments" "other embodiments", "many embodiments", "one embodiment", "illustrative embodiment", "another embodiment", "some other embodiments", "illustrated embodiments", "embodiments", "instances", "one instance", "some instances", "another instance", "other instances", "one case", "this case", "some cases", "such cases", "these cases", "many cases", "another case", "other cases", "cases", or variants thereof means that a particular described feature, structure, characteristic, stage, action, process, function, functionality, procedure, method, element, entity, or system is included in at least one example of the subject matter, but not necessarily in all examples, and therefore should not be construed as limiting the subject matter. The appearance of the same term does not necessarily refer to the same example(s).

The terms "illustrated example", "illustrated embodiments", and variants thereof, may be used to direct the attention of the reader to one or more of the figures, but should not be construed as necessarily favoring any example over any other.

Usage of conditional language, such as "may", "might", "could", and variants thereof should be construed as conveying that one or more example(s) of the subject matter may include, while one or more other example(s) of the subject matter may not necessarily include, certain feature(s), structure(s), characteristic(s), procedure(s), stage(s), action(s), process(es), function(s), functionality/ies, method(s), element(s), entity/ies and/or system(s). Thus such conditional language is not generally intended to imply that a particular described feature, structure, characteristic, procedure, stage, action, process, function, functionality, method, element, entity or system is necessarily included in all examples of the subject matter, and consequently should not be construed as limiting the subject matter.

The terms "including", "comprising", and variants thereof should be construed as meaning "including but not necessarily limited to".

The terms "based on", "on the basis of", and variants thereof should be construed as meaning "at least partly based on".

The terms "attribute data" and "attribute manufacturing data" are used interchangeably herein.

The terms "memory", "computer readable medium" "non-transitory memory", "non-transitory computer readable medium", and variants thereof should be expansively construed to cover any volatile and/or non-volatile computer memory.

The subject matter is not limited to any specific type(s) of electronic items. The term "electronic items" (also referred to herein as "items") may include dies, electronic components (also referred to herein as "components"), electronic modules (also referred to as "modules", end-user devices (also referred to herein as "devices"), etc. A module may include an assembly of components, associated wiring, and optionally other modules. Associated wiring may include, for instance, integrated electrical connections such as pads, bond wires, solder balls, solder bumps, leads, traces, jumpers, plugs, pins, connectors, vias, and any of a myriad variety of other means of providing electrical continuity where needed.

When the subject matter includes components, modules and/or devices, the subject matter is also not limited to any particular type(s) of components, modules, and/or end-user devices. However, for the sake of further illustration to the reader, some examples of components, modules, and devices are now provided.

Examples of components may include active components such as integrated circuits, VLSI microchips, systems-on-a-chip (SOC), arrays of semiconductor memory and/or logic circuits, bipolar transistors, field effect transistors (FETs), thyristors, diodes, vacuum tubes, and/or passive components such as resistors, capacitors, inductors, memristors, thermistors, thermocouples, antennas, coils, fuses, relays, switches, conducting wires and connectors. Examples of modules may include printed circuit (PC) boards, motherboards, daughterboards, plug-ins, expansion cards, assemblies, multi-chip packages (MCPs), multi-chip modules (MCMs), potted and encapsulated modules, interposers, sockets, and the like.

Additionally or alternatively, components and/or modules may refer to components and/or modules based on applications of photonic radiation of any wavelength that generate, detect, receive, transmit, convert and control such radiation, for example lasers, masers, light emitting diodes (LEDs), microwave klystron tubes, various light generation sources using electricity, photovoltaic cells, liquid crystal displays (LCDs), charged coupled devices (CCDs), CMOS sensors, optical connectors, waveguides, including any of various devices from the field of optoelectronics, etc.

Additionally or alternatively, components and/or modules may refer to components and/or modules based on applications of magneto-electronics that utilize magnetic phenomena, such as the magnetic medium of computer hard drives and spintronic applications that utilize electron spin in their functionality, for example magnetoresistive random-access memory (MRAM), and giant magnetoresistance (GMR) components such as those used in the read heads of computer hard drives, etc.

Additionally or alternatively, components and/or modules may refer to components and/or modules based on electro-mechanical applications such as electric motors and generators, microelectromechanical systems (MEMS) of various functions, transducers and piezoelectric components, and crystals as used in resonant electronic circuits and the like.

Additionally or alternatively, components and/or modules may refer to components and/or modules based on electro-chemical applications generating electricity, such as batteries used to provide power to electric or hybrid vehicles and batteries used in mobile electronic consumer products, including various forms of chemical batteries, and also including various forms of fuel cells. Also included are applications generating electrical responses to chemical conditions, such as the detection components of various gas sensors, ion-sensitive field-effect transistor (ISFET) sensors, biosensors, pH sensors, conductivity sensors, and the like.

Additionally or alternatively, devices may refer to devices that an end-user uses and that may include electronic components and/or modules that have been manufactured prior to and separately from the manufacturing of the end-user device. The term "end-user" or variants thereof may refer to a user who uses an (end-user) device, after the device has completed the manufacturing flow of the device.

Usage of terms such as "providing", "obtaining", "clustering", "selecting", comparing", "determining", "performing", "computing", "calculating", "estimating", "looking up", "identifying", developing", "adjusting", "repeating", "reducing", "functioning", "transforming", "converting", "initiating", "augmenting", "changing", "maintaining", "confirming", "testing", "placing", "using", "sending", "issuing", "tracing", "detecting", "expanding", "indicating", "generating", "adapting", "receiving", "allowing", "enabling" "accessing", "outputting", "inputting", ""presenting", "reporting", "causing", "analyzing", "associating", "storing", "transmitting", "writing", "reading" "executing", "implementing", "transferring", "evaluating", "examining", ""notifying", "checking", "establishing", "communicating", "requesting", "querying", "responding", "answering", "deciding", "concluding", "displaying", "preparing", "collecting" "defining", "recognizing", or variants thereof, may refer to the action(s) and/or process(es) of any combination of software, hardware and/or firmware.

For instance, such term(s) may refer in some cases to action(s) and/or process(es) of one or more electronic machine(s), each made up of any combination of software, hardware and/or firmware, and each including at least some hardware and data processing capabilities that manipulates and/or transforms data into other data, the data represented as physical quantities, e.g. electronic quantities, and/or the data representing the physical objects. In these cases, one or more of the action(s) and/or process(es) in accordance with the teachings herein may be performed by one or more such electronic machine(s) each specially constructed and thus configured for the desired purposes, by one or more such general purpose electronic machine(s) each specially configured for the desired purposes by computer readable program code, and/or by one or more such electronic machine(s) each including certain part(s) specially constructed for some of the desired purposes and certain part(s) specially configured for other desired purposes by computer readable program code. Terms such as "computer", "computing part", "electronic machine", "computing machine"," and the like should be expansively construed to cover any kind of electronic machine, made up of any combination of software, hardware and/or firmware, having at least some hardware and data processing capabilities (whether analog, digital or a combination), including, by way of example, a personal computer, a laptop, a tablet, a smart-phone, a server, a computing part of a tester, any other kind of electronic machine with at least some hardware and with data processing capabilities, and/or any combination thereof. The hardware of an electronic machine may include, for instance, at least one processor and/or memory.

The term "processor", "processing unit" and the like should be expansively construed to cover any type of processor such as a digital signal processor (DSP), a micro-controller, a field programmable gate array (FPGA), an application specific integrated circuit (ASIC), any known architecture of processor whether single or multi parallel distributed and/or any other, etc. As mentioned above, the term "memory", should be expansively construed to cover any volatile and/or non-volatile computer memory. Memory may store data for the short and/or long term. Memory may be local (e.g. internal and/or external to the electronic machine) and/or remote from the electronic machine. Examples of memory may include: any type of disk including floppy disk, hard disk, optical disk, CD-ROMs, magnetic-optical disk, magnetic tape, flash memory, random access memory (RAMs), dynamic random access memory (DRAM), static random access memory (SRAM), read-only memory (ROMs), programmable read only memory PROM, electrically programmable read-only memory (EPROMs), electrically erasable and programmable read only memory (EEPROMs), magnetic card, optical card, any other type of media suitable for storing electronic instructions and capable of being electrically coupled to a system bus, a combination of any of the above, etc.

It should be appreciated that certain feature(s), structure(s), characteristic(s), procedure(s), stage(s), action(s), process(es), function(s), functionality/ies, method(s), element(s)), entity/ies and/or system(s) disclosed herein, which are, for clarity, described in the context of separate examples, may also be provided in combination in a single example. Conversely, various feature(s), structure(s), characteristic(s), procedure(s), stage(s), action(s), process(es), function(s), functionality/ies, method(s), element(s), entity/ies and/or system(s) disclosed herein, which are, for brevity, described in the context of a single example, may also be provided separately or in any suitable sub-combination.

Any electronic item (e.g. first electronic item) may be processed through a manufacturing flow that includes a plurality of manufacturing steps. The first step of the manufacturing flow may be a fabrication step when the item is fabricated. The final step of the manufacturing flow that includes fabrication of the item may include the disposal or retention of the item (e.g. for delivery to an end-user or inclusion in another electronic item). In between there may be one or more testing steps.

When the item is be included in another electronic item, the item may additionally or alternatively be tested during a manufacturing flow that includes fabrication of that other electronic item, (and so on, if the other electronic item is then included in yet another electronic item, etc.). The item may thus become a part of the supply chain that leads to a (final) end-user item product (e.g. end-user device) containing the item being delivered to the end-user. Therefore any manufacturing flow which includes fabrication of an item or of another item that includes the item may be considered to be a manufacturing flow of the item. In a distributed supply chain, different manufacturing flows, different manufacturing steps within a certain manufacturing flow, different manufacturing sub-steps within a step, and/or different combinations of manufacturing sub-step and/or steps within a certain manufacturing flow may be performed by different members of the supply chain (OCM, OEM, ODM, etc). In such a supply chain, in addition to a plurality of manufacturing sub-steps, manufacturing steps, and/or manufacturing flows, there may be one or more distribution stages where the items are transferred to other members of the supply chain.

Possibly, a manufacturing step may include various sub-steps. For instance, the Sort step may include the sub-steps of Sort1, Sort2 and Sort3. For another instance, the Final Test step may include the sub-steps of Hot Test and Cold Test. For another instance, the Fabrication step may include the sub-steps of Deposition, Lithography, Etch, Implant, etc.

Testing of an item "during manufacturing" (or in other words during a manufacturing flow that includes fabrication of the item and/or during a manufacturing flow that includes fabrication of another item such as a module or end-user device including the item) may currently be performed by two basic procedures. Items may be tested a single unit at a time sequentially, and/or several may be tested at the same time in "parallel". Single unit testing may be more common with more complex items such as CPUs while memory items may often be tested in parallel. A testing sub-step (or step, if the step does not include sub-steps) in a manufacturing flow may in some cases be distinguished from other testing steps and/or sub-steps (and/or from testing in-use) by the operation. The operation may be defined, for example by the specific type of testing under specific test conditions. For example, for a particular testing sub-step, a set of tests may be performed at a given temperature, whereas for another testing sub-step, the same (or similar) tests may be performed at a different temperature. By way of another example, functional tests may be applied at one testing sub-step and structural tests may be applied at another testing sub-step.

Testing steps in a manufacturing flow may include, for example any of: E-test (or Electrical Parametric Testing), Sort (or wafer probe test), Burn-in, Assembly, Final Test, Board Assembly, System Level Test (SLT), System Assembly, System Validation, etc. For instance, Sort may be performed while items are still at the wafer level whereas at Final Test, the items may have already been packaged. Electrical Parametric tests, for instance, may be executed on the wafers scribe line (between the dies) and may measure transistor parametric characteristics. Burn-in may be executed, for instance, after packaging, in order to simulate an extended life cycle by stressing the item at a high temperature (in a burn-in oven) while applying an elevated voltage at an extended duration. System Validation may be performed, for instance, as the last testing step by testing the item in "customer mode". For example, during System Validation, a CPU item may be placed on an actual motherboard and "booted-up" using an operating system as well as testing other software applications.

It is noted that items of different products/models may go through different testing steps. In addition, not all items of the same product/model may necessarily go through the same testing steps. For example, burn-in and system validation may be tested in "sample mode", meaning that not all units may undergo these testing steps. Moreover, since one of the goals of testing is to filter out unreliable items, items that fail a certain testing step may in some cases be treated differently than those that did not fail, e.g. the failed items may be discarded, continue to be tested under a modified manufacturing flow, incorporated in other items than originally planned, etc.

It is noted that the above discussion regarding possible manufacturing flows is not binding on all embodiments of the subject matter.

Testing of an item may additionally or alternatively be performed while the item is in use (e.g. as an end-user device or as part of an end-user device), using a Built-In Self Test BIST (and/or any similar test such as: Programmable Built-In Self-Test (PBIST), Memory Built-In Self-Test (MBIST), Power-Up Built-In Test (PBIT), Initialization Built-In Test (IBIT), Continuous Built-In Test (CBIT), Power-On Self-Test (POST), Joint Test Action Group (JTAG) Interface connected to an on-chip Test Access Port (TAP) etc) structure that is electrically coupled to the item, or to another item including the item. "In use" may mean e.g. after delivery of the end-user device to the end-user. The testing performed by such a structure may in some cases be distinguished from other testing (e.g. during a manufacturing flow and/or while in use) by the operation. The operation may be defined, for example by the specific type of testing under specific test conditions. It is noted that not all items may have BIST structures and/or similar test structures electrically coupled thereto and/or electrically coupled to items including these items, thereby eliminating the possibility of this type of testing (and possibly eliminating all testing), for these items while these items are in-use. It is also noted that in some cases a BIST structure and/or similar test structure may also be used during manufacturing for testing. For example an external electronic instrument that is not necessarily a tester, such as a JTAG controller, may connect to an item and read out the BIST results during a testing step of a manufacturing flow. However, for simplicity of description, the description herein focuses on the more typical in-use testing performed by a BIST structure and/or similar test structure.

For simplicity of description, a particular manufacturing step or sub-step, or particular in-use testing may be considered to be common to various items, if the same operation (e.g. Fabrication, E-test, Sort, Burn-in, Assembly, Final Test, Board Assembly, SLT, System Assembly, System Validation, BIST and/or similar test, Disposal/Retention, etc) is being performed for the items, regardless of whether or not peripheral details regarding the operation are exactly the same for the various items. For instance, referring to peripheral details regarding an operation for the various items, the operation may be performed at the same time or at different times; the operation may be performed at the same location (e.g. same factory) or at different locations; the operation may be performed by the same member of a supply chain or by different members of the supply chain; the operation may use the same naming convention when creating manufacturing data (e.g. attribute manufacturing data) or may use different naming conventions; the operation may include only the same tests, or may include the same tests and optionally other tests, the operation may be performed by the same equipment or be performed by similar equipment, etc.

In some embodiments of the presently disclosed subject matter, during testing of an electronic item (e.g. first electronic item), the item may be evaluated not only with relation to passing or failing one or more tests, but also with regard to the possibility that the item may be counterfeit. In these embodiments, the counterfeit detection may be considered to be performed on the item while the item is being tested (e.g. being tested when the item is not included in any other item, e.g. being tested as part of testing of another item that includes the item). The terms "during testing of an item", "while the item is being tested", "item that is being tested", "item in the process of being tested", etc. are used herein interchangeably when referring to an item that is being tested. For instance, in these embodiments the counterfeit detection may be performed while the item is being tested during manufacturing and/or during in-use testing. Referring to cases of counterfeit detection during in-use testing, counterfeit detection may be considered to be performed while the item is being tested if the counterfeit detection is performed during an instance of in-use testing, typically although not necessarily shortly after test data (e.g. first test data) for an item (e.g. first item) has been obtained. (Typically although not necessarily a BIST structure or similar test structure used for in-use testing may be electrically coupled to the item, or to another item including the item, during in-use testing, and possibly even when testing is not taking place). Referring to cases of counterfeit detection during manufacturing testing, counterfeit detection may be considered to be performed while the item is being tested, if the counterfeit detection is performed as part of an existing testing sub-step or existing testing step of a manufacturing flow that includes fabrication of the item or includes fabrication of another item that includes the item (i.e. without adding a separate counterfeit detection step or sub-step to a manufacturing flow). Typically although not necessarily in these cases counterfeit detection, may occur while the item, or another item including the item, is electrically coupled to a manufacturing tester. Typically although not necessarily, counterfeit detection that is performed as part of an existing step or sub-step may not add a measurable delay to execution of the existing step or sub-step. For example, a measurable delay may be a delay greater than a threshold of 1 second, but this threshold may be raised or lowered. Continuing with this example, the threshold may be raised for a slower, cheaper and/or less utilized tester, and may be lowered for faster, more expensive, and/or highly utilized tester. Additionally or alternatively, typically although not necessarily, counterfeit detection that is performed as part of an existing step or sub-step may allow performance of an action consequent to a determination that an item is counterfeit or not counterfeit, prior to moving the item to the next usual stage (e.g. binning, next step or sub-step, inclusion in another electronic item, delivery to an end-user, etc.) that would have been occurring if counterfeit detection had not been performed.

In some other embodiments of the presently disclosed subject matter, detection of a counterfeit item may additionally or alternatively be considered to be performed on an item while the item is not being tested. In these embodiments, the detection of a counterfeit item may still be made during a manufacturing flow of the item (e.g. in between steps, in between sub-steps, as part of an added step or added sub-step, etc.). Additionally or alternatively, in these embodiments the detection of a counterfeit item may be made at other times such as between various manufacturing flow(s) of the item, before a first instance of in-use testing by a BIST or similar test structure, between various in-use testing instances by any BIST structure and/or by any similar test structure, and/or after testing of the item has ceased, etc. Therefore the timing of counterfeit detection is not limited by the presently disclosed subject matter, and may occur at any suitable time(s).

Depending on the embodiment, an item that is detected to be counterfeit may or may not be treated differently than one that is not detected as counterfeit. Possible treatment of an item which is detected as counterfeit and possible treatment of an item which is not detected as counterfeit are described further below. For simplicity of description, an electronic item which is being evaluated with regard to the possibility of being counterfeit is referred to herein as "first item" or "first electronic item". The electronic items that are not the first electronic item but which are used for evaluating whether or not the first electronic item is counterfeit are referred to herein as "reference items" or "reference electronic items".

FIG. 1 is a block diagram of a counterfeit detection system 100, in accordance with some embodiments of the presently disclosed subject matter. System 100 may be made up of any combination of software, hardware and/or firmware that performs the function(s) as described and explained herein. Similarly, any of the elements shown in FIG. 1 may be made up of any combination of software, hardware and/or firmware that performs the function(s) as described and explained herein. Possibly the combination of software, hardware and/or firmware which makes up system 100 may include one or more processors and/or memory, for performing at least part of the function(s) described herein. System 100 may be concentrated in a single location or dispersed over a plurality of locations.

The subject matter does not limit the manner of communication between different elements in system 100, if apart. However, for the sake of further illustration to the reader, some examples are now provided. For instance, the means of transmission may include: the Internet or any other wide area network(s), local area network(s) (wired and/or wireless), cellular tower(s), microwave transmitter tower(s), satellite communication(s), automotive telemetry technologies, etc. The protocols used for transferring the data may be any appropriate protocol for the means of transmission.

In the illustrated embodiments, system 100 may include a counterfeit determiner element 130, and a database element 140. In the illustrated embodiments, counterfeit determiner 130 may include any of the following elements: a traceability element 132 configured to provide (attribute) data from other (attribute) data, a clustering analysis element 134 configured to obtain manufacturing data, a test data comparison element 136 configured to compare test data of items, and/or a rules element 138 configured to determine whether or not the item is counterfeit, based on result(s) of the test data comparison.

Optionally, system 100 may also include element(s) other than counterfeit determiner 130 and database element 140, such as a tester 110 and/or a proxy 120. Tester 110 may be a manufacturing tester (or in other words a tester used during manufacturing). Additionally or alternatively, tester 110 may be a BIST or similar test structure used for testing while an item is in use (e.g. as an end-user device or as part of an end-user device).

Tester 110 may include, for instance, a tester operating system 112. As shown in FIG. 1, a first item (illustrated in FIG. 1 as the DUT) may be electrically coupled to tester 110. However in some embodiments, the first item (or another item including the first item) may not be electrically coupled to tester 110 during the functioning of counterfeit determiner 130 (e.g. during execution of at least the stage of determining whether or not the first item is counterfeit, based on at least one result of the comparing in method 200). Reference herein to the word "tester" (and/or "proxy") in the single form should be construed to cover embodiments where there is only one tester (and/or proxy) in system 100 and/or embodiments where there is a plurality of testers (and/or proxies) in system 100.

Although counterfeit determiner 130 is illustrated in FIG. 1 as being on a computer 150 that is a server, counterfeit determiner 150 may in some embodiments be included in one or more computer(s) 150 of any type (not necessarily server(s)) that is not part of tester 110, may be included on tester 110 and/or may be distributed partly between tester 110 and partly between computer(s) 150. For example, if counterfeit determiner 130 or a part thereof is included on tester 110, counterfeit determiner 130 or the part thereof may be included in a computing part of tester 110. In this example, the computing part of tester 110 may be part of the existing infrastructure of tester 110 and/or may be added for the sake of counterfeit detection. For simplicity of description, although system 100 may include one or more computer(s) 150, the single form of computer 150 is used herein. Reference herein to computer 150 in the single form should be construed to cover embodiments where there is only one computer 150 in system 100 and/or embodiments where there is a plurality of computers 150 in system 100.

In embodiments which include at least part of counterfeit determiner 130 on computer 150, there may be communication between tester 110 and computer 150 in any manner. For simplicity of illustration, tester 110 and computer 150 are shown in FIG. 1 as configured to communicate via one or more proxy/ies 120. However in some embodiments, tester 110 and computer 150 may be configured to additionally or alternatively communicate in any other manner(s), such as communicate via an Application Programming Interface API if tester 110 is a manufacturing tester, etc. Additionally or alternatively, tester 110 and computer 150 may not necessarily be configured to communicate with each other, in order for there to be communication between tester 110 and computer 150. In embodiments where there may be communication between tester 110 and computer 150, the manner of communication between tester 110 and computer 150 may or may not vary depending on whether or not tester 110 and computer 150 are at the same location or remote from one another. In addition, in embodiments where there may be communication between tester 110 and computer 150, the manner of communication between tester 110 and computer 150 may or may not vary depending on whether or not tester 110 is a manufacturing tester or a BIST (or similar test) structure. For instance, in some embodiments, data generated by a manufacturing tester may be collected at the same location and as close as possible to the tester, say by proxy 120, and transferred to computer 150 (which may be at the same location or remote from proxy 120). In this instance, in some embodiments, data generated by a BIST structure may instead be transmitted to a collection point remote from the BIST structure. For example, the collection point may be the location of computer 150 (which may or may be controlled by a manufacturer). For another example, the collection point may be the location of a computer of a manufacturer, which may then transfer the data to another location where computer 150 is located.

In embodiments where there may be communication between tester 110 and computer 150, the subject matter does not limit what may be communicated, but for the purpose of further illustration to the reader, some examples are now provided. For example, there may be communication of test data to counterfeit determiner 130 on computer 150, if the test data may be used by at least part of counterfeit determiner 130 and this at least part of counterfeit determiner (e.g. test data comparison element 136) is on computer 150. Continuing with this example, in some cases, operating system 112 on tester 110 may be configured to communicate test data. For another example there may be communication between tester 110 and computer 150 of a "thing", if at least part of counterfeit determiner 130 (e.g. rules element 138) is on computer 150 and generates this thing which may be used by tester 110. Continuing with this example, in some cases, counterfeit determiner 130 may be configured to generate indication(s) for tester 110 of at least some action(s) resulting from counterfeit determination or non-counterfeit determination, and/or to generate trigger(s) for tester 110 to perform at least at least some action(s) resulting from counterfeit determination or non-counterfeit determination, when such action(s) are to be performed by tester 110. For instance, the generated indication(s) and/or trigger(s) may be provided to operating system 112 on tester 110.

Database element 140 may include at least one database. In the illustrated embodiments, database element may include at least three types of data (manufacturing, testing and genealogy), in three different databases, but in some embodiments data may be included in fewer or more databases. Continuing with these latter embodiments, at least some of the data may be integrated together in fewer than three databases. Additionally or alternatively, in some embodiments, database element 140 may include less than three types of data (e.g. may exclude genealogy data). In embodiments where database element 140 may include more than one database, the databases may be consolidated at the same location, not consolidated but at the same location, and/or distributed over more than one location. For simplicity of description, it is assumed herein that database element 140 includes three databases, namely a genealogy data database 142, a manufacturing data database 144, and a test data database 146.

The subject matter is not limited to a particular database configuration or data warehouse design for database element 140. Depending on the embodiment, the data comprised in database element 140 may be stored locally with respect to where the counterfeit detection is performed, and/or stored remotely in a different location and/or in a cloud, etc. If database element 140 includes local data storage, the local data storage may or may not include storage on tester 110, and may or may not include storage on computer 150. Depending on the embodiment, any database in database element 140 may or may not be consolidated in any manner, may or may not or divided in any manner, and/or may or may not be shared with other systems than system 100. In some embodiments, it is possible that database element 140 or a part thereof may be provided by other system(s), even third party system(s). Therefore the term "database" when used herein should be construed broadly to include any organized collection of data in memory.

For example, the way the data is stored in database element 140 may be governed by performance requirements and/or security requirements. Continuing with this example, in some cases, it may be desirable that the database configuration or data warehouse design for database element 140 allow for necessary data to be extracted soon after the data has been generated. In these cases, existing Manufacturing Execution System (MES), Factory Information System (FIS), test or any similar databases may be included in database element 140, and used as data sources. Additionally or alternatively, in these cases relevant data may be proactively extracted from those MES, FIS, test, etc. databases and stored in database element 140 (in this case a dedicated database), to improve data availability and performance.

For simplicity of illustration, database element 140 is depicted in FIG. 1 as being in a cloud, but in some embodiments, at least part of database element 140 may be on a manufacturing floor and/or anywhere else than a cloud. Similarly, although counterfeit detector 130 is not depicted in FIG. 1 as being in a cloud, in some embodiments at least part of counterfeit detector 130 may be in a cloud.

The term cloud in this disclosure does not necessarily imply the standard implementations such as IAAS, PAAS, SAAS (respectively, Infrastructure, Platform or Software As A Service). In terms of hardware, in some embodiments, the cloud may be implemented on any combination of types of computer hardware capable of providing the functionality required. For instance, the deployment may use physical and/or virtual servers and/or standard servers where ownership and/or administration of these servers may be by any of the related parties or any third-party. For example, such servers may be provided by cloud service companies such as Amazon LLC. Additionally or alternatively, for instance, the deployment may include dedicated appliances such as in-memory databases; commodity servers such as those used for Hadoop and NoSQL solutions; storage solutions which are either built into the servers themselves or provided separately (such as Network-Attached Storage (NAS)) and/or any other similar types of implementation. In some examples, the hardware of a cloud based entity (such as a data center, distributed data center, server, farm, IT department etc) may be located either in the same physical location or in multiple locations connected through any type of wired or wireless communication infrastructure.

Referring now to the illustrated elements of counterfeit determiner 130, test comparison element 126 may be configured to compare test data from tester 110 (for item(s) being tested), test data queried from database element 140 (e.g. from test data database 146), and/or, e.g. in cases where test data comparison element 126 is on computer 140, test data currently computed by computer 150). Test data queried from database element 140 (for the first item and/or for some or all of the reference items) may have been previously generated by tester 110, by other tester(s), by computer 150, and/or by other computer(s) and stored in database element 140.

In some embodiments where test comparison element 126 may compare test data from tester 110, item(s) being tested may include the first item and/or one or more reference items. The usage of item(s) being tested as reference item(s) may occur unintentionally, for example because execution of method 200 (described below) may result in one or more of the items(s) being tested being found to be reference item(s). Additionally or alternatively, the usage of item(s) being tested as reference items may be desirable, and in this case, one or more item(s) being tested may be proposed as possible reference item(s), and the appropriateness of these item(s) being reference item(s) may be checked by way of execution of method 200.

Test data may be a type of manufacturing data. Test data is not limited by the subject matter, but for the purpose of illustration to the reader, some examples are now provided. Test data may refer to data relating to tests of an item (or in other words testing of an item), where the tests may occur when the item is not included in another item and/or when the item is included in another item. Test data may comprise, for example the actual test results collected for the item (e.g. actual bin, measured Voltage, measured wavelength, etc), virtual test results calculated based on the actual test results, and/or test meta data (e.g. test time, yield, part result record (PRR), etc), etc. For instance, the actual test results may include results from at least two tests of the item. Test descriptions identifying the tests (e.g. bin 1, threshold voltage, optical test, etc.) and/or test conditions (e.g. tester type, test operation, temperature, etc.) may be associated with the test data.

First test data may be test data which is known to relate to the testing of the first item, for instance because first test data is received by counterfeit determiner 130 from tester 110, and/or for instance because first test data, retrieved from database element 140 and/or computed by computer 150, is known to have resulted from testing of the first item. Therefore, test data comparison 136 may be configured to obtain first test data for the first item from tester 110, from test data database 146 and/or from computations performed by computer 150. The first test data may relate to a plurality of tests of the first item (where the plurality of tests may occur when the first item is not included in another item and/or when the first item is included in another item). Test comparison 136 may possibly be configured to also obtain test descriptions and/or test conditions associated with the first test data.

Second test data may also be test data. Test data comparison 136 may be configured to obtain second test data from test data database 146, tester 110 and/or from computations performed by computer 150, for "second" electronic items that may include reference items and optionally the first item. See below for further information. Second test data may relate to second tests of the second electronic items (where for a particular second item, the tests may occur when the particular item is not included in another item and/or when the particular item is included in another item). The second tests may comprise tests that are identical to the first plurality of tests, tests that are comparable to the first plurality of tests, or both. This means that the second tests may be identical to the first plurality of tests, the second tests may be comparable to the first plurality of tests, or part of the second tests may be identical to part of the first plurality of tests and the other part of the second tests may be comparable to the other part of the first plurality of tests.

In some embodiments, test comparison element 136 may be configured to compare first test data and second test data. In some of these embodiments, test comparison element 136 may be configured to compare test data relating to tests of items at given manufacturing step(s) and/or sub-step(s) (that is/are a testing step(s) and/or sub-step(s)) and/or to compare test data relating to in-use tests. The tests of a certain item at testing step(s) and/or sub-step(s) may have occurred during a manufacturing flow including fabrication of the certain item and/or during manufacturing flow(s) including fabrication of item(s) including the certain item. If a testing step or sub-step is during a manufacturing flow of an item including the certain item, the tests may still be considered to be of the certain item (or in other words the testing may still be considered to be of the certain item), even if actually performed on item(s) including the certain item, as long as the test data may be attributable to the certain item. For instance a large fraction of the test data obtained during SLT of a board containing a CPU may be attributable to the CPU.

In some of these embodiments, test comparison element 136 may be configured to compare a large suite of test data in order to increase the coverage and/or the entropy, and/or in order to use as much available information as possible about the item. Moreover usage of a large suite of test data may make it less feasible to replicate (e.g. to clone) the design or the technology of the item as it may require reproducing a large number of item characteristics that may be covered by the test data. If test data comparison 136 is configured to compare a large suite of test data, test comparison 136 may be able to detect fundamental changes in response to testing (e.g. that first test data is a multivariate outlier with respect to second test data) which may be indicative of a technology and/or design difference between the first item and the reference items. For instance, it may even be possible for test comparison element 136 to be configured to utilize the entirety of test data collected for an item (e.g. first item, e.g. reference item) relating to the testing of the item at one or more testing steps, to utilize the entirety of test data collected for an item relating to the testing of the item at one or more sub-test steps of a given test step, and/or to utilize the entirety of test data collected for an item relating to one or more instances of in-use testing of the item. In this instance, if it is assumed that the first test data for the first item relates to a plurality of tests of the first item, then the plurality of tests may include at least one of: all of the tests performed during at least one testing sub-step, or all of the tests performed during at least one in-use testing instance. In some other of these embodiments, the test data that is used may be more limited. For instance, it is possible that the test data that is used may only include passing test data. Additionally or alternatively, for example, the test data that is used may necessarily include critical test data, but may include or exclude non-critical test data. Continuing with this example, critical test data may be identified, for instance, based on historical performance of counterfeit determiner 130, by observing which test data resulted in the past in more robust detection of counterfeit items.

Depending on the embodiment, the testing of reference items which results in test data for the reference items may take place at the same time and/or location, or at different time and/or location relative to the testing of the first item.

In some embodiments, test data comparison 136 may be configured to use the test descriptions and test conditions associated with the first test data in order to identify test data from among test data for the second items that may be compared with the first test data. In these embodiments, this comparable test data may be considered to be the second test data relating to second tests. It is noted that differences in test conditions may introduce a shift into the second test data with respect to the first test data. If the difference may not be avoided, test data comparison 136 may be configured in some examples to adjust at least one of the first test data or the second test data based on a known relationship between the test condition(s) that is/are different and the test data, so as to compensate for the shift. For example, if there is an unavoidable difference in temperature conditions for collecting Threshold Voltage (Vt) for first and second data, it may be possible to still compare between the Vt's as long as at least one of the Vt's is adjusted for the difference in temperature based on a known equation describing an effect of Temperature on Voltage.

As mentioned above, it is possible that second items may include the first item and that the second test data may therefore include the first test data. In this case, having the first test data included in the second test data may necessarily lead to a conclusion that the first item is not counterfeit once the first test data is compared to the second test data by test data comparison 136. This case is discussed in more detail with reference to FIG. 2.

As also mentioned above, clustering analysis element 134 may be configured in some embodiments to obtain manufacturing data, e.g. from manufacturing data database 144. The subject matter does not limit the type(s) of manufacturing data that may be included in manufacturing data database 144, but for the purpose of further illustration to the reader, some examples are now provided.

In some examples, manufacturing data may comprise processing data generated by fabrication equipment involved in the physical construction ("fabrication") of an electronic item, test data generated by testing equipment (e.g. tester 150 and/or other testing equipment) involved in testing of an electronic item, data generated during rework in fabrication, historical or transactional data generated based on operational information contained in MES databases and related to history of the manufacturing that is being performed, data generated by an FIS. The term manufacturing equipment or equipment may refer to fabrication equipment and/or testing equipment. Note that the manufacturing data for a particular electronic item may possibly cover one or more manufacturing sub-steps, steps and/or flows, and/or one or more instances of in-use testing that may occur in the same and/or in various geographical locations and may be performed by the same and/or by different members of the supply chain. For instance, in some of these examples, manufacturing data associated with a particular electronic item, may have been generated during a manufacturing flow that includes fabrication of the particular electronic item, during manufacturing flow(s) that include fabrication of other electronic item(s) that includes the particular item, and/or during in-use testing, etc.

Additionally or alternatively in some examples, manufacturing data may include logistical data (collected by (or from) MES through the manufacturing flow(s)) physical measurements (taken during component fabrication phase, during assembly packaging, during PC board manufacturing, etc.), fabrication data generated by fabrication equipment, testing data, manufacturing equipment maintenance data, monitor data, etc.

Additionally or alternatively, in some examples, manufacturing data may be categorized into parametric data, function data and/or attribute data.

Parametric data, for instance, may include numerical data resulting and/or derived from various physical measurements, fabrication, monitoring, maintenance, and/or testing, often times (but not always) represented as non-integer. For example, this data may be in any format representing a numerical value, or range or set of numerical values. Parametric data may, for example, quantify some aspect of the item's processing or performance, such as power consumption, critical dimensions, defectivity in a wafer, maximum clock frequency, calibration setting for an on-chip digital to analog converter (DAC) circuit, final test operation time, number of reworks, number of dead pixels, etc. Any of the above parametric data, if collected and/or generated for a fabrication step of the manufacturing flow, may constitute fabrication data.

Function data, for instance, may include data indicating some aspect of the functionality, configuration, status, classification, and/or non-parametric condition of an item. Function data may result and/or be derived from various physical measurements, fabrication, monitoring, maintenance, and/or testing using a tester (e.g. manufacturing tester, maintenance/monitoring external tester, a BIST structure or similar test structure, etc). For example, this data may be in any data format representing a functionality or operational state, configuration, status, classification (e.g. bin), or non-parametric condition. For example function data may be represented in binary format, e.g., by 1=passing/functional and 0=failing/non-functional. Continuing with this example, in some embodiments such function data may result from execution of an item's native end-usage functions, for example, the result of a read-write-read pattern executed on a memory item, or the result of execution of a series of user instructions on a CPU item. Additionally or alternatively, in some embodiments such function data may result from execution of non-user functions, designed into an item for the purposes, for example, of enhancing test coverage, reducing test time, or gathering information regarding the item's condition or behavior. For example, a result of testing performed using a BIST, PBIST, MBIST, PBIT, IBIT, CBIT, and/or POST structure, or of testing performed using structural scan circuitry, or of reading an item's configuration or status using engineering readout circuitry may be represented by function data. Any of the above function data, if collected and/or generated for a fabrication step of the manufacturing flow, may constitute fabrication data.

Attribute data for instance, may refer to qualitative data indicating some aspect of the processing of an item such as a characteristic of the item or the processing of the item that may not necessarily be measured but may be inherent. For example, this data may be in any format. Examples of attribute data may include identification information used for tracking the item within a given manufacturing step or flow or across the manufacturing chain, product name, name of manufacturer, manufacturing environmental conditions, design revision used, fabrication equipment used, test equipment used, process materials used, plant/geographic information, time of manufacture, test software revision used, manufacturing conditions deliberately or inadvertently applied, equipment maintenance events/history, processing flow and manufacturing event history (e.g. dates, events, etc.), classification data, disposition data (including scrap disposition), configuration data (including data identifying the components comprising the item), construction data, state of plant where manufactured, operations personnel information, probecard used, whether the item was retested, data regarding physical placement within substrates, packages, wafers or plates (e.g. center vs. edge or reticle location, die x, y coordinates, board position of the item on PC board, position of the item in multichip module, location of a display on a glass plate, etc.), and/or processing batch data (e.g., die identifiers, wafer numbers, plate numbers, lot numbers, etc.), etc. Any of the above attribute data, if collected and/or generated for a fabrication step of the manufacturing flow, may constitute fabrication data.

As discussed above, test data comparison 136 may in some embodiments use a large suite of test data. However, usage of a large suite of test data may increase the sensitivity of counterfeit detection to normal process variations within legitimate manufacturing flow(s), possibly resulting in classification of non-counterfeit items as counterfeit. Therefore, in these embodiments, and possibly even in embodiments with more limited test data, second items for which second test data is obtained may be carefully determined, in order to reduce the likelihood that detected fundamental changes in testing response were in reality caused by a normal variation in manufacturing process between the first item and the second items. For example, reference items may be items that are associated with manufacturing data that is identical and/or similar to that presumably associated with the first item. Assuming identical and/or similar manufacturing data, the reference items and the first item may be expected to have been manufactured (to date) under a matching manufacturing process and therefore a detected difference in testing behavior may be indicative that the first item is counterfeit.

To understand further why a detected difference in testing behavior may be indicative that the first item is counterfeit, it is noted that in some cases, not all manufacturing data that is presumed to be associated with the first item, may necessarily be actually associated with the first item if the first item is counterfeit, meaning that not all presumably associated manufacturing data may necessarily accurately reflect the actual manufacturing (e.g. actual fabrication and/or testing) of the first item. For example, assume that (first) attribute data which is obtained for the first item is not completely true with respect to the first item. The first attribute data may be associated with manufacturing data, but in this case the manufacturing data associated with the first attribute data may not accurately reflect the actual manufacturing of the first item (and therefore may be incorrectly associated with the first item). As stated above, the first test data may be known to relate to the first item. The second test data may be obtained for second items associated with manufacturing data (e.g. that is identical and/or similar to manufacturing data that is associated with the first attribute data, and/or e.g. that conforms to attribute data provided based on the first attribute data). However, due to the mismatch between the manufacturing data that is associated with the first attribute data, but which does not accurately reflect the actual manufacturing of the first item, and the first test data which is known to relate to the first item, the comparison of the first test data and second test data may lead to a determination that the first item is counterfeit.

It is further noted, that in some embodiments it is possible that not all manufacturing data may necessarily accurately reflect the actual manufacturing of the second items, and/or that not all second test data may necessarily relate to the second items. In some of these embodiments, counterfeit determiner 130 may be configured to ignore this possibility and rely on the likelihood of the majority of the second items having associated manufacturing data accurately reflecting the actual manufacturing and of the majority of second test data relating to the second items. This likelihood may increase for a larger number of second items. In others of these embodiments, second test data may only relate to items which have previously been determined to not be counterfeit (e.g. using method 200 or any other procedure).

Returning to the discussion of embodiments regarding the determination of second items, in some of these embodiments, in order to achieve a careful determination of the second items for which second test data is obtained, clustering analysis 134 may be configured to obtain a large suite of manufacturing data in order to determine second items that are unlikely to experience a significant amount of normal process variation or be subjected to a major process excursion relative to the first item. In some cases it may be possible for clustering analysis 134 to be configured to obtain the entirety of available manufacturing data in database element 140, meaning all obtainable manufacturing data that is associated with second attribute data (to be described below).

However, in some other of these embodiments, clustering analysis 134 may be configured to obtain more limited manufacturing data in order to determine the second items for which second test data is obtained. For instance, it may be more efficient to focus on "critical" manufacturing data that represents the most critical sub-steps of the manufacturing flow(s) or captures the most amount of process variation. In this instance, the obtained manufacturing data may necessarily include critical manufacturing data, but may include or exclude non-critical manufacturing data The determination of which manufacturing data is critical is not limited by the subject matter but for the sake of further illustration to the reader, some examples are now provided.

One example of critical data may include fabrication data relating to fabrication of the second items. Continuing with this example, such critical data may include a measurement of critical dimensions (CD) for the lithography sub-step which represents one of the most critical fabrication processes in microprocessor manufacturing. Continuing with this example, such critical data may additionally or alternatively include geographical proximity data indicating how physically close the first item and reference items were during manufacturing. Another example of critical data may be test data collected during preceding test steps, preceding test sub-steps, and/or preceding in-use testing instances, since this test data may capture the most process variability up to that point. In some cases where critical manufacturing data is focused on, an engineer may identify, during a set up process for system 100, critical manufacturing data based on knowledge about underlying fabrication and/or testing processes and the sensitivities of these processes. Critical manufacturing data may additionally or alternatively be identified based on historical performance of counterfeit determiner 130 by observing what manufacturing data resulted in the past in more robust detection of counterfeit items, Based on the critical manufacturing data identification, manufacturing data database 144 may be filtered to exclude non-critical manufacturing data or may be augmented to include information about how critical some manufacturing data is.

As mentioned above, in some embodiments rules element 138 may be configured to determine whether the first item is counterfeit or not counterfeit, based on result(s) of the test data comparison performed by test data comparison element 138. In some of these embodiments, rules element 138 may be configured to perform at least one act consequent to the determination of whether or not the first item is counterfeit. For example, being configured to perform act(s) may include being configured to perform action(s) and/or to initiate action(s) (e.g. by generating indication(s) of action(s), and/or by generating trigger(s) for one or action(s)). In the case of an initiated action, the action may be performed elsewhere than counterfeit determiner 130 such as by tester 110, elsewhere in system 100, and/or external to system 100.

In some cases of these embodiments, the determination and/or consequent performance of act(s) and/or non-performance of act(s) by rules element 138 may be based on rules. The rules are not limited by the subject matter, but for further illustration to the reader some examples are now provided. For example, rules element 138 may be configured, due to the rules, to interpret the result(s) of the test data comparison, in any appropriate way. Additionally or alternatively, for example, rules element 138 may be configured, due to rules, to perform any appropriate act(s), and/or to not perform act(s), subject to the interpretation of the result(s). Continuing with this example of being configured to perform act(s) or not to perform act(s) subject to the interpretation of the result(s), rules element 138 may be configured to perform or not perform one or more action(s) and/or to initiate or not initiate one or more action(s) (e.g. by generating and/or not generating indication(s) of one or more action(s), and/or by generating and/or not generating trigger(s) for one or more action(s)).

As mentioned above, traceability element 132 may be configured to provide data from other data. In some embodiments, this provision may include tracing data. In some cases of these embodiments, different manufacturing steps and/or flows may be performed by different members of a supply chain, who may use different nomenclature. For example, the same qualitative data may appear as different attribute data at different manufacturing steps and/or flows performed by different members of the supply chain. More broadly, in these embodiments, the same qualitative data may possibly appear as different attribute data at different manufacturing sub-steps, steps and/or flows for any intended reason, or unintentionally. Similarly in these embodiments, different nomenclature may possibly be used in in-use testing than during manufacturing and/or in different instances of in-use testing. Traceability element 132 may therefore be configured in these embodiments to trace data such as attribute data (e.g. between manufacturing sub-steps and/or steps within a given manufacturing flow, across multiple manufacturing flows, between manufacturing and in-use, across in-use instances. etc). For example, traceability element 132 may be configured to trace attribute data, by querying database element 140 (e.g. genealogy database 142). Traceability element 132 may be configured in this example to provide attribute data relating e.g. to a particular manufacturing sub-step, and receive from database element 140 attribute data relating to e.g. other manufacturing sub-step(s) in the same manufacturing step, other manufacturing step(s) in the same manufacturing flow, other manufacturing flow(s), and/or in-use testing instance(s). If attribute data is provided relating e.g. to a particular manufacturing step, then similarly, attribute data may be received relating to e.g. other manufacturing step(s) in the same manufacturing flow, other manufacturing flow(s), and/or in-use testing instance(s). If attribute data is provided relating e.g. to a particular manufacturing flow, then similarly, attribute data relating e.g. to other manufacturing flow(s) and/or in use testing instance(s) may be received. If attribute data is provided relating e.g. to a particular in-use testing instance, then similarly, attribute data relating e.g. to manufacturing flow(s) and/or other in-use testing instance(s) may be received. Genealogy database 142 comprises such related attribute data.

Additionally or alternatively, in these embodiments traceability element 132 may be configured to trace attribute data for an item that includes another item, to the attribute data for the other item, and/or vice versa. For example, traceability element 132 may be configured to trace attribute data, by querying database element 140 (e.g. genealogy database 142). Traceability element 132 may be configured in this example to provide attribute data relating e.g. to an item including another item, and receive from database element 140 attribute data relating to the other item, and/or vice versa.

The manner in which genealogy data may be arranged, and/or the manner in which traceability element 132 may function to trace data is not limited by the subject matter, but for the sake of further illustration to the reader two examples are now provided. In one example, genealogy data may be arranged, and the manner in which traceability element 132 may function to trace data is described in U.S. Pat. No. 7,529,695 which is hereby incorporated by reference herein. In this patent lot tracking is executed by the BUSINESS LOGIC to store detailed information related to a lot in the production supply chain. Lot tracking records the flow of a lot by keeping its genealogy in order to track the lot history. These records include a parent-child relationship for the unsplit lots and include a sibling relationship for split lots. Lot tracking information is loaded, for example, using WIP or DTR information. Lot tracking keeps a complete and consistent data set for all the production related information in one central place. With this common repository of lot information for the entire supply chain, lot tracing may be provided.

In another example genealogy data may be additionally or alternatively arranged so as to include associations such as an association between attribute data of an electronic item and attribute data of other items comprised in the item. For instance, during fabrication of an item, a list (or other data structure) of other items that are included in the item may be provided to database element 140 so that associations may be established between attributes of the other items and attributes of the item.

In some embodiments, tracing of data may not be required. For example, in some cases attribute data used in method 200 may be the same for the same qualitative data across all manufacturing sub-steps, steps, manufacturing flows, and in-use testing instances related to the attribute data used in method 200. Additionally or alternatively, for example, attribute data may be obtained for the item which is being evaluated in order to determine if the item is counterfeit rather than for another item including the item being evaluated.

In some embodiments, system 100 may include one or more processor(s), e.g. in computer 150 and/or in tester 110 (e.g. in computing part of tester 110). In some of these embodiments, any of counterfeit determiner element 130 and/or the elements within counterfeit determiner element 130 (e.g. traceability 132, clustering 134, test data comparison 136 and/or rules 138), or any part thereof may be considered to be functional element(s) comprised in the processor(s). Therefore, in these embodiments, reference may be equivalently made to such processor(s) acting as any of these elements (130, 132, 134, 136 and/or 138) or any part thereof. In these embodiments, function(s) attributed herein to element(s) 130, 132, 134, 136 and/or 138 may be equivalently attributed to such processor(s).

In some embodiments where computer 150 and/or tester 110 may include processor(s), the processor(s) may be configured to perform function(s) in accordance with computer-readable program code implemented on at least one memory. For example, the function(s) may be function(s) attributed herein to any of counterfeit determiner element 130 and/or the elements within counterfeit determiner 130 (e.g. traceability 132, clustering analysis 134, test data comparison 136 and/or rules 138).

It is noted that the teachings of the present subject matter are not bound by counterfeit detection system 100 described with reference to FIG. 1. For example equivalent and/or modified functionality may be consolidated and/or divided in another manner, and/or may be implemented in any appropriate combination of software, firmware and hardware. For another example, a counterfeit detection system in accordance with the subject matter may include fewer, more and/or different elements than shown in FIG. 1. Continuing with this example in some cases, a counterfeit detection system may include only counterfeit determiner 130 or a part thereof, or may include counterfeit determiner 130 (or a part thereof) and one or more other element(s) illustrated and/or not illustrated in FIG. 1. For another example, the functionality of a counterfeit detection system in accordance with the subject matter may be divided differently among the elements illustrated in FIG. 1. Therefore, any function attributed herein to a particular element in system 100 may in some embodiments be additionally or alternatively performed by other elements(s). For another example, the functionality of a counterfeit detection system in accordance with the subject matter may be divided among fewer, more and/or different elements than shown in FIG. 1. For another example, a counterfeit detection system in accordance with the subject matter may include additional, less, and/or different functionality. For another example, a counterfeit detection system in accordance with the subject matter may additionally or alternatively include other functionality relating to and/or not relating to counterfeit detection. A counterfeit detection system in accordance with the subject matter may be a standalone entity, or may be integrated, fully or partly with other systems.

Figure 2:
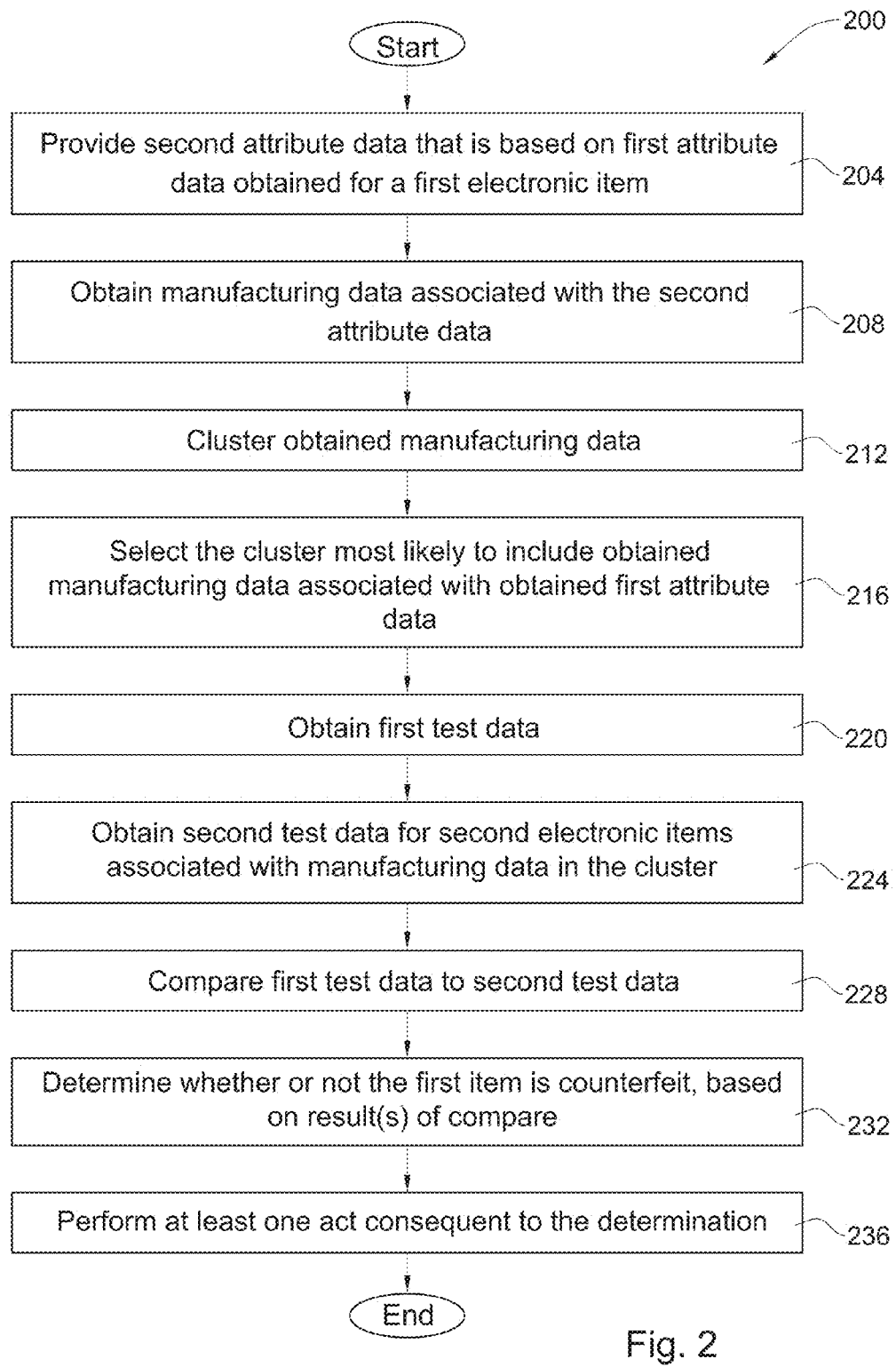
FIG. 2 is a flowchart of a method of counterfeit detection, in accordance with some embodiments of the presently disclosed subject matter.

FIG. 2 is a flowchart of a counterfeit detection method 200, in accordance with some embodiments of the presently disclosed subject matter. In some embodiments, method 200 may be performed by counterfeit determiner 130.

In some embodiments, counterfeit determiner 130 (e.g. traceability element 132) may obtain first attribute data for a first electronic item.

In some of these embodiments, the first electronic item may be considered to be counterfeit if the first attribute data is not true with respect to the first electronic item, whereas the first electronic item may be considered to not be counterfeit if the first attribute data is true with respect to the first electronic item. Therefore, detection of whether or not the first electronic item is counterfeit may be equivalent to confirming or not confirming the truth of the first attribute data with respect to the first electronic item.

In some of these embodiments, the first attribute data may be obtained from tester 110 (e.g. from tester operating system 112), that is responsible for the plurality of tests of the first item. For instance, tester 110 may generate a Standard Test Data Format (STDF) file which may include first attribute data for the item being tested. In some other of these embodiments, the first attribute data may additionally or alternatively be obtained from database element 140 or from elsewhere. In the case of in-use, in some of these embodiments, the first attribute data may be obtained as part of BIST (or similar) output, obtained from an end-user device (which may be the first item or may be an item that includes the first item), or may be obtained for the end-user device from database element 140 or elsewhere.

In some of these embodiments, at least part of the obtained first attribute data may be based on incoming information that was provided to the member(s) of the supply chain responsible for the plurality of tests of the first item (to which the first test data is related).

In some of these embodiments, at least part of the obtained first attribute data for the first item may be traced from attribute data obtained for other item(s) that include the first item.

In some of these embodiments, the first attribute data obtained for the first item may uniquely identify a single item, for instance by including unique (i.e. unit-level) identification (ID) such as an electronic component ID (ECID) or any other form of unit-level ID for the first item. In some other of these embodiments, the first attribute data obtained for the first item may not uniquely identify a single item. For instance, assume no individual incoming information is provided for individual items in a given batch (where the given batch of items may include the first item, when the first item is not included in another item or when the first item is included in another item). In this instance, the incoming information may only include incoming batch information, e.g. order or shipment information provided for a given batch of items (also referred to as collection, shipment, reel, box, etc.). In this instance, further assuming that first attribute data is based on incoming information, the attribute data assigned to identify each item within that batch may be based on this batch information. In some other of these embodiments, the first attribute data obtained for the first item may include both unit-level identification as well as well as non-unit level identification.

It is noted that there may be a distinction between a given batch, which refers to a collection of items at a given manufacturing sub-step or step of the supply chain and is often based on a collection received in an incoming shipment, and a manufacturing batch, in particular a fabrication batch, which refers to a collection of items fabricated together in a fabrication sub-step or step of a manufacturing flow. For example in a semiconductor supply chain, at final test, the given batch may be based on a reel of tape, while the fabrication batch may be based on a fabrication lot.

In a first example of obtained first attribute data, the obtained first attribute data for the first item may include an ECID "LOT12345WAF12X1Y2" and attribute data based on batch information for a given batch that includes the first item, namely "Broadcom part B123456". The entirety of this information may form the first attribute data for the first item that is obtained by counterfeit determiner 130.

In a second example of obtained first item attribute data, the obtained first attribute data may not include an ECID, but the obtained first item attribute data may include attribute data based on batch information for a given batch that includes the first item namely "Xilinx part X7891". The entirety of this information may form the first attribute data for the first item that is obtained by counterfeit determiner 130.

In the illustrated embodiments, in stage 204, counterfeit determiner (e.g. traceability element 132) may provide second attribute data that is based on first attribute data obtained for the first electronic item. The first electronic item may or may not be in the process of being tested (e.g. when the item is not included in any other item or as part of testing of another item that includes the item).

Depending on the embodiment, the feature of the second attribute being based on first attribute data may or may not mean that at least part of the second attribute data may be identical to at least part of first attribute data. When identical, the first attribute data may be used "as is" as second attribute data.

In embodiments where at least part of the second attribute data is not identical to obtained first attribute data, at least part of the obtained first attribute data may or may not need to be adapted by counterfeit determiner (e.g. by traceability element 132), before determining at least part of the second attribute data on the basis of obtained first attribute data. The manner in which at least part of the obtained first attribute data may be adapted is not limited by the subject matter but for the sake of further illustration to the reader, an instance is now provided. For instance, adaptation may be performed when obtained first attribute data is scrambled, such as when first attribute data includes an obfuscated ECID. In such cases counterfeit determiner 130 may decode the ECID before using the ECID to obtain second attribute data.

In embodiments where at least part of the second attribute data is not identical to obtained first attribute data, data may or may not be traced. For instance, in some embodiments, providing the second attribute data may include tracing obtained first attribute data relating to a given manufacturing sub-step, manufacturing step, manufacturing flow, in-use testing instance, etc. to attribute data identifying the first item at one or more previous manufacturing sub-step(s), step(s), flow(s) and/or instance(s), etc. e.g. using genealogy data as discussed above. ("Previous" attribute data is described in the next few paragraphs as identifying the first item, ignoring for simplicity of description the possibility that the previous attribute data may not be true with respect to the first item). Manufacturing sub-step(s), step(s), flow(s) and/or in-use testing instance(s) that occurred before the given manufacturing sub-step, manufacturing step, manufacturing flow, in-use testing instance, are termed "previous". In another instance, in some embodiments, providing second attribute data may include tracing obtained first attribute data relating to a given manufacturing sub-step, manufacturing step, manufacturing flow, or in-use testing instance, etc e.g. using genealogy data, directly to second attribute data, even if the second attribute data includes expanded attribute data compared to the first attribute data.

In embodiments where at least part of the second attribute data is not identical to obtained first attribute data, data may or may not be expanded. For instance, in some embodiments, providing second attribute data may include expanding attribute manufacturing data for the first item, such as expanding obtained first attribute data and/or expanding traced attribute manufacturing data identifying the first item at one or more previous manufacturing step(s), manufacturing flow(s) and/or in-use testing instance(s), etc. In some cases with data expansion, expanded attribute manufacturing data may be included as second attribute data. In some cases with data expansion, attribute data of the first item (e.g. obtained first attribute data and/or traced attribute data) may be expanded in order to increase the number of items with conforming attributes. For example, x y coordinates for the first item may be expanded to include adjacent wafer area in order to allow identification of more items manufactured in geographical proximity to the first item. In another example, the manufacture date for the first item may be expanded to include adjacent dates to allow identification of more items manufactured before or after the first item. In yet another example, the fabrication batch number or lot-ID may be expanded to include adjacent lots to allow identification of more items manufactured before or after the first item.

Referring again to the first example of first attribute data described above, counterfeit determiner 130 may use obtained first attribute data "LOT12345WAF12X1Y2" and/ or "Broadcom part B123456", e.g. in conjunction with database element 130, including genealogy data and possibly manufacturing data, to obtain attribute manufacturing data that identifies the first item at previous manufacturing sub-step(s), manufacturing step(s), manufacturing flow(s), and/or in-use testing instance(s), etc. For instance, the identifying attribute data at, say, a previous manufacturing step may include that the first item is a Bluetooth Transmitter that was manufactured as part of Lot 1234 Wafer 12 at Location X1-Y2 by TSMC Fab 14 on Jul. 12 2015 for Broadcom. As may be seen by the reader, this identifying attribute data at, say, a previous manufacturing step may provide a basis for obtaining a fine set of second attribute data. A further drill down into even more specific attribute data for the first item may also be possible. In this example, the second attribute data associated, say with a previous manufacturing step may include at least some of this identifying attribute data (e.g. Bluetooth transmitter, TSMC, Broadcom, and/or Fab 14 etc), and/or expanded data for at least some of this identifying attribute data (e.g. adjacent wafer area, adjacent lots, and/or adjacent dates, etc).

It is noted, that it is possible in an adapted first example, that the obtained first attribute data may have additionally or alternatively included attributes such as Bluetooth Transmitter, Lot 1234, Wafer 12, Location X1-Y2, TSMC Fab 14, Jul. 12 2015, Broadcom, and that in this case, database element 140 may have been used to retrieve the identifying attribute data in accordance with the corresponding nomenclature used, say in a previous manufacturing step. Additionally or alternatively, it is noted that it is possible that in an adapted first example, first attribute data may have been traced directly to second attribute data (even in a case where at least some of the second attribute data is expanded), using database element 140.

Referring now to the second example of first attribute data described above, counterfeit determiner 130 may use obtained first attribute data "Xilinx parts X7891", e.g. in conjunction with database element 140, including genealogy data and possibly manufacturing data to obtain attribute manufacturing data identifying the first item at previous manufacturing sub-step(s), manufacturing step(s), manufacturing flow(s), and/or in-use testing instance(s), etc. For instance, the identifying attribute data at, say, a previous manufacturing step may include that the first item is a 7 Ohm Resistor manufactured by Grace Semiconductors in 2014 for Xilinx. As may be seen by the reader, this identifying attribute data at, say, the previous manufacturing step may provide a basis for obtaining a coarse set of second attribute data. Further drill down into more specific attribute data for this first item may not necessarily be possible. The second attribute data associated, say, with a previous manufacturing step may include, for example, this identifying attribute manufacturing data (e.g. 70 Ohm resistor, Grace semiconductors, 2014, and/or Xilinx, etc). Expansion of this identifying attribute manufacturing data may not be necessary as this (more coarse) identifying attribute data may allow for a sufficient number of items to have conforming attribute data.

The above two examples referred to embodiments where at least part of the second attribute data may not be identical to obtained first attribute data. However, in some embodiments at least part of the second attribute data may additionally or alternatively be identical to obtained first attribute data. For instance, in some embodiments, obtained first attribute data at a given manufacturing sub-step, step, flow, in-use testing instance, etc may in some cases also be relevant at previous manufacturing sub-step(s), manufacturing step(s), manufacturing flow(s) and/or in-use testing instance(s), (e.g. if the same member of supply chain performs the relevant previous operations, e.g. if the first item has an ECID, etc). If adaptation and expansion of this data are not necessary, then obtained first item attribute data may possibly also function as second attribute data. Referring again to the two examples above, if in the first example, obtained first attribute data at, say, a given step (e.g. Broadcom part B123456) is also attribute data relating to, say, a previous manufacturing step and a sufficient number of items may have conforming attribute data, then this obtained first item attribute data may be used as second attribute data. Referring again to the second example, if in the second example the obtained first attribute data (e.g. Xilinx part X7891) at, say, a given step is also attribute data relating to, say, a previous manufacturing step and a sufficient number of items may have conforming attribute data, then this obtained first item attribute data may be used as second attribute data.

Therefore, in various embodiments, second attribute data that is based on first attribute data obtained for the first item may include, obtained first attribute data ("as is"). Second attribute data may additionally or alternatively include data resulting from adapting, data resulting from tracing, data resulting from expanding, data resulting from adapting and tracing, data resulting from adapting tracing and expanding, data resulting from adapting and expanding, and/or data resulting from tracing and expanding, etc. The subject matter is not bound by these embodiments of second attribute data, and second attribute data may additionally or alternatively include data resulting from one or more other function(s), alone and/or in combination with the function(s) listed in this paragraph.

The function(s) represented by the term "providing" in the clause "providing second attribute data that is based on first attribute data obtained for a first electronic item" is not limited by the subject matter, but for the purpose of further illustration to the reader some examples are now provided. For example, providing second attribute data that is based on first attribute data obtained for the first item, may include: obtaining second attribute data that is first attribute data obtained for the first item (or in other words, obtaining second attribute data inherently when obtaining first attribute data), defining second attribute data as being identical to first attribute data obtained for the first item, and/or getting second attribute data by performing any of adapting, tracing, expanding, and/or any other processing of first attribute data obtained for the first item, etc.

The subject matter is also not bound by any particular content in second attribute data, but for the sake of further illustration to the reader some instances are now provided.

In some instances, second attribute data may include the name of the manufacturer of the first item, the product name/model of the first item, and/or processing flow identifier of the first item. In some of these instances, more specific first attribute data may provide a basis for obtaining second attribute data that is narrower. In some cases of these instances, it may be desirable that the obtained first attribute data include as much information as possible so as to enable counterfeit determiner 130 to determine narrow second attribute data.

In some instances, second attribute data may not necessarily include fabrication lot from a fabrication step or sub-step of a manufacturing flow that includes fabrication of the first item, or may not necessarily only include fabrication lot. It is noted that the fabrication lot (or in other words fabrication batch) may not necessarily include items whose test data may be expected to be comparable at any time subsequent to fabrication. Fabrication lots may not necessarily remain stable within a supply chain (i.e. items in a fabrication lot may not necessarily be subsequently processed together), and consequently a common fabrication lot may not necessarily be a sufficient cause of comparable test data. Additionally or alternatively, even if a fabrication lot remains stable within a supply chain, due to normal process variability within the lot, in some cases only part of a fabrication lot may exhibit comparable test data or even none of the other items in the fabrication lot may exhibit comparable test data to the test data of the first item. Therefore, in these instances, second attribute data may include a large suite of attribute data, which may or may not include the fabrication lot information.

In some instances, as it is not yet confirmed that obtained first attribute data is true with respect to the first item, it may be desirable that second attribute data reflect obtained first attribute data, rather than actual features of the first item, if there is an inconsistency (e.g. due to obtained first attribute data not being true with respect to the first item). For instance, second attribute data that is identical to first attribute data may necessarily reflect first attribute data. In another instance, second attribute data may relate, at least partly, to manufacturing sub-step(s), manufacturing step(s), manufacturing flow(s), and/or in-use testing instance(s), where there may be greater control over the items, and therefore less likelihood that data may reflect counterfeit items. Continuing with this instance, assume that during fabrication of items, the items are closely tracked, whereas in some cases it may be easier to insert counterfeit items afterwards. In these cases, if after fabrication, a counterfeit first item was inserted and processed (in subsequent manufacturing sub-step(s), manufacturing step(s), manufacturing flow(s) of item(s) including the counterfeit first item, in-use testing instance(s), etc), the attribute data and other manufacturing data logged during this processing may reflect actual features of the counterfeit first item. Such logged attribute(s) may be erroneously provided as second attribute data that is based on first attribute data obtained for the first item, even though in actuality the second attribute data may not reflect obtained first attribute data that is not true with respect to the counterfeit first item. Therefore in some examples of this instance, second attribute data may include fabrication attribute data, as it may be considered sufficiently likely that fabrication attribute data reflects obtained first attribute data, rather than actual features of the first item, if there is an inconsistency (e.g. due to obtained first attribute data not being true with respect to the first item). In these examples, second attribute data may include fabrication attribute data, solely or in combination with other attribute data, where fabrication attribute data may relate to one or more fabrication sub-step(s) of a manufacturing flow that includes fabrication of the first item.

In the illustrated embodiments, in stage 208 counterfeit determiner 130 (e.g. clustering analysis 134), may obtain manufacturing data associated with the second attribute data provided in stage 204.

The subject matter does not limit the manner in which the manufacturing data associated with the second attribute data may be obtained. However, for the sake of illustration to the reader, an example is now provided. In this example, the manufacturing data may be received by counterfeit determiner 130 as a result of query to database element 140 (e.g. manufacturing data database 144). For instance, counterfeit determiner 130 may query database element 140 for manufacturing data (e.g. attribute data, function data, and/or parameter data) of items having attribute data that conforms to the second attribute data. For any item, the attribute data that conforms may include all attribute data for the item, or only part of the attribute data for the item. The subject matter does not limit the meaning of attribute data conforming to the second attribute data but for the sake of further illustration to the reader, some examples are now provided. For example, conforming may mean being identical (e.g. the second attribute data defines a certain equipment name, and according to the attribute data of an item, the item was manufactured using the named equipment). For another example, conforming may additionally or alternatively mean being within a set defined by the second attribute data (e.g. second attribute data defines manufacture date as any date in July, and according to the attribute data for an item, the item has a manufacture date of July 12).

Depending on the embodiment, the manufacturing data that is obtained in stage 208 may include attribute data that conforms to the second attribute data (and therefore may be considered to be associated with second attribute data), and/or may include other manufacturing data for items having attribute data that conforms to the second attribute data (and therefore this other manufacturing data may be considered to be associated with second attribute data). For example, if clustering analysis is to be performed (stage 212) then obtained manufacturing data may at least include manufacturing data that is termed herein "statistically manipulable". Statistically manipulable manufacturing data may be manufacturing data that may be analyzed for degree of similarity even when not identical. Examples of statistically manipulable manufacturing data may include parametric data, and possibly some type(s) of function and/or attribute data. The manufacturing data that is used in stage 212 may typically although not necessarily be different than attribute data that conforms to the second attribute data.

In the illustrated embodiments, in stage 212, counterfeit determiner 130 (e.g. clustering analysis 134) may perform cluster analysis on obtained manufacturing data, clustering obtained manufacturing data into one or more "clusters" (also referred to herein as "manufacturing clusters"). For instance, the "cluster analysis" (or in other word "clustering") may be performed on all of the obtained manufacturing data (e.g. if only statistically manipulable was obtained) or on part of the obtained manufacturing data (e.g. if data that is not statistically manipulable is also obtained, and/or if for any reason it is not desirable to cluster some of the data that is obtained).

In some embodiments, the underlying statistical task known as cluster analysis or clustering may be a task that groups manufacturing data in such a way that manufacturing data in the same group (the same manufacturing cluster or cluster) are more similar to each other than to those in other groups (in other manufacturing clusters or clusters). The subject matter does not limit the procedure for clustering and any of a variety of algorithms that have been developed for solving the task of clustering may be used. For instance, Wikipedia at https://en.wikipedia.org/wild/Cluster_analysis lists possible algorithms that include connectivity based, centroid based, distribution based, density based, etc.

The manufacturing data (e.g. statistically manipulable manufacturing data) on which the clustering may be performed, may vary depending on the embodiment. In some embodiments, a large suite of manufacturing data (e.g. statistically manipulable manufacturing data) may be used in order to yield a closer matching between the manufacturing processes. For instance even the entirety of available manufacturing data that may be used for clustering (e.g. entirety of obtainable statistically manipulable manufacturing data associated with the second attribute data) may be used in order to simplify the obtaining of the data by obtaining (e.g. in stage 208) all of the available data. In some other embodiments, more limited manufacturing data (e.g. more limited statistically manipulable manufacturing data) may be used, for instance only "critical" manufacturing data.

In some embodiments, the manufacturing data (e.g. statistically manipulable manufacturing data) on which the clustering may be performed may include at least some fabrication data. For any item, fabrication data may include, for example, function, parametric and/or attribute data collected and/or generated for the fabrication step of the manufacturing flow that includes fabrication of the item. In these embodiments, clustering may not necessarily be performed on all this fabrication data, but on at least some fabrication data. In these embodiments, non-fabrication data may or may not also be included in the manufacturing data on which clustering may be performed. The manufacturing data on which the clustering may be performed may include at least some fabrication data, for instance, if it is assumed that fabrication data may be depended upon due to tighter control over items, whereas manufacturing data from after fabrication may not necessarily be depended upon. In an extreme example, if the manufacturing data that is clustered included testing data from tests performed on a counterfeit first item and no data accurately reflecting a manufacturing process which an item described by obtained first attribute data would have undergone, the clustering may result in a cluster which includes manufacturing data that matches the actual manufacturing process of the counterfeit first item, (rather than matching the manufacturing process which would be expected from the obtained first attribute data), making it difficult to detect that the first item is counterfeit.

In some embodiments, larger dissimilarity between manufacturing data within clusters may be required in order to increase cluster size (e.g. in order to obtain larger quantity of said second items). Depending on the type of clustering analysis, cluster size can be increased by changing the analysis specification: specifying smaller number of clusters, specifying larger cluster sizes, specifying larger distance between observations (e.g. larger dissimilarity between manufacturing data), etc. Any of these may result in an unintended difference in manufacturing data that is included in a manufacturing cluster. The possible impact of this unintended difference in manufacturing data included in a manufacturing cluster is discussed further below with regard to testing data.

In the illustrated embodiments, in stage 216, counterfeit determiner 130 (e.g. clustering analysis 134) may select the cluster, from the one or more clusters, that is most likely to include obtained manufacturing data associated with obtained first attribute data.

In some embodiments, obtained manufacturing data may be associated with attribute data that is traced from obtained first attribute data, (e.g. by traceability element 132), and therefore may be considered to be associated with obtained first attribute data. Additionally or alternatively, in some embodiments, obtained manufacturing data may be directly associated with obtained first attribute data, and therefore may be considered to be associated with obtained first attribute data.

In some embodiments, stage 216 may include counterfeit determiner 130 identifying which cluster may be most likely to include obtained manufacturing data associated with obtained first attribute data. The subject matter does not limit how the cluster is identified but for the sake of further illustration to the reader two examples are now provided.

For example, the identification may be performed by counterfeit determiner 130 (e.g. clustering analysis 134) looking up unique attribute data (e.g. obtained first attribute data that uniquely identifies a single item; and/or attribute data traced, for instance by traceability element 132, from obtained first attribute data that uniquely identifies a single item; etc.) in group(s) of attribute data respectively associated with cluster(s), in order to determine which group includes this unique attribute data, and thereby determine that the associated cluster is most likely to include obtained manufacturing data associated with obtained first attribute data.

In another example, a statistical model may have been developed during clustering in stage 212. This example may be particularly useful when counterfeit determiner 130 may not have available unique attribute data but may have available manufacturing data used in the clustering (e.g. statistically manipulable manufacturing data) that is associated with obtained first attribute data. This model may subsequently be applied in stage 216 to obtained manufacturing data (e.g. statistically manipulable manufacturing data) that is associated with obtained first attribute data in order to determine which cluster is most likely to include obtained manufacturing data associated with obtained first attribute data. It is noted that in this example, in order to apply the model, it may not be necessary that obtained first attribute data and manufacturing data that is associated therewith be unique to a single item in order to determine which cluster is most likely to include obtained manufacturing data associated with obtained first attribute data. For instance, assuming obtained first attribute data or attribute data traced from obtained first attribute data includes a lot identifier but not a die identifier, it may still be possible to obtain manufacturing data (e.g. fabrication data) for the lot, that may not be die specific, but may be sufficient to allow the model to determine the cluster.

It is noted that in many cases, there may be no guaranteed continuity between a fabrication batch and the batch at a given manufacturing sub-step or step and therefore it may not be assumed that items within a given batch necessarily have similar manufacturing data. On the one hand, it may be possible that a same collection of items may be processed together throughout the manufacturing flow(s). However, on the other hand, collections of items that are processed together and/or in close proximity to one another may be dissolved and/or reconstituted during a manufacturing flow(s), depending on the technology. Moreover, in a dispersed and fragmented supply chain, the contents of a given batch may be under the control of a member of the supply chain who may not be interested in detection of counterfeit items. Any of the above may make it less desirable to routinely evaluate whether or not the first item is counterfeit based on comparing test data of the first item with test data of other items from the same given batch that is under control of the same member. (It is noted that for simplicity of description the first item and other items are described herein as being from a given batch, within the same given batch, in a given batch, and variants thereof, regardless of whether the given batch includes the first item and the other items when these items are not included in further items, or the given batch includes further items that in turn include the first item and the other items). In addition, any of the above may significantly limit the usability of implied sameness or similarity between items within a given batch and therefore it may not be desirable to presume that the manufacturing data for a (given) batch at a given manufacturing sub-step or step constitutes a cluster, unless such a cluster is determined by performing stages such as those described above. It is of course possible that after performing stages such as described above, one or more items in a given batch may have manufacturing data in the same cluster.

In some embodiments, the manufacturing data obtained in stage 208 may also be considered to define the (manufacturing) cluster, and therefore stages 212 and 216 may be omitted. For instance, stages 212 and 216 may be omitted in some cases, if none, or an insufficient quantity, of the manufacturing data that is obtained in stage 208 is statistically manipulable. Continuing with this instance, little or no manufacturing data for clustering (such as statistically manipulable manufacturing data) may be available that is associated with the second attribute data. Continuing with this instance, the manufacturing data that is obtained may therefore only or predominantly include attribute data that conforms to the second attribute data and that is not statistically manipulable. Additionally or alternatively, stages 212 and 216 may be omitted if it is impossible to select a cluster. It may be impossible to select a cluster, for example because it may be impossible to definitively associate manufacturing data used in clustering (such as statistically manipulable manufacturing data) to obtained first attribute data. In these embodiments where the manufacturing data obtained in stage 208 may also be considered to define the (manufacturing) cluster, the manufacturing cluster that is so defined may be considered to be the cluster that is most likely to include obtained manufacturing data associated with obtained first attribute data. In these embodiments, it may be possible to obtain a large suite of manufacturing data in order to yield a closer matching between the manufacturing processes, or to obtain more limited manufacturing data, for instance only the "critical" manufacturing data, as described above.

In the illustrated embodiments, in stage 220, counterfeit determiner 130 (e.g. test data comparison element 136) may obtain first test data relating to a first plurality of tests of the first item. For instance, the plurality of tests may include at least one of: all of the tests performed during at least one testing sub-step, or all of the tests performed during at least one in-use testing instance. Additionally or alternatively, for instance, the test data may include critical test data. Counterfeit determiner 130 may, for example, obtain first test data for the first item (e.g. from tester 110, computer 150 and/or database element 140 (e.g. test data database 146)). Possibly, in addition to test data, counterfeit determiner 130 may obtain the test descriptions and/or test conditions that are associated with the first test data. Additional details and/or other examples regarding first test data were provided above with reference to FIG. 1.

In the illustrated embodiments, in stage 224, counterfeit determiner 130 (e.g. test comparison element 136) may obtain second test data relating to second tests of second items. The second tests may comprise tests that are identical to the first plurality of tests, tests that are comparable to the first plurality of tests, or both. The second items may be associated with manufacturing data in the cluster.

Details on second test data were provided above with reference to FIG. 1. For instance, counterfeit determiner 130 may receive second test data from tester 110, computer 150, and/or database element 140 (e.g. test data database 146).

Depending on the embodiment, stages 220 and 224 may be performed in any order, or concurrently. When the stages are performed concurrently, the first and second test data may be obtained as a single action (e.g. as a result of a single query to database 140), or as two separate actions.

Depending on the embodiment, the first test data that is obtained may necessarily only include passing test data, or may include passing and/or failing test data. Depending on the embodiment, the second test data that is obtained may necessarily only include passing test data, or may include passing and/or failing test data.

In some embodiments, in order to obtain second test data for second items, attribute data for the second items may be needed. For instance, in some cases, attribute data for second items, in conjunction with the test descriptions and/or test conditions associated with the first test data may be used to obtain second test data from database element 140 (e.g. test data database 146). Attribute data for second items may include sufficient data to enable obtaining second test data for the second items (without obtaining test data for items that are not second items). In some of these embodiments, as a result of stage 208 or 216, counterfeit determiner 130 (e.g. clustering analysis 134) may obtain attribute data for second items, and/or may obtain (previous) attribute data for second items that only relate to previous manufacturing sub-step(s), manufacturing step(s), manufacturing flow(s), in-use testing instance(s), etc. and therefore may not be used to obtain second test data. For instance, the attribute data or previous attribute data may be obtained from the cluster, or may be obtained from a group of attribute data associated with the cluster. If previous attribute data is obtained, as a result of stage 208 or 216, then in some cases, counterfeit determiner 130 (e.g. traceability element 132) may trace the previous attribute data for the second items, relating to previous manufacturing sub-step(s), manufacturing step(s), manufacturing flow(s), in-use testing instance(s), etc. to attribute data for the second items. For instance, counterfeit determiner 130 may query database element 140 (e.g. genealogy database 142) for attribute data for the second items corresponding to the previous attribute data. In some other embodiments, attribute data for the second items may not be needed, for instance, if second test data may be obtained from database element 140 by way of manufacturing data in the cluster, and/or for instance, for any second test data received from tester 110, etc.

As mentioned in the above paragraph, in some cases, test descriptions and/or test conditions associated with the first test data may be used to obtain second test data. However, in some of these cases, a variation in test conditions for the first item and the second items may introduce a shift into the second test data with respect to the first test data. If the difference in test conditions may not be avoided, counterfeit determiner (e.g. test data comparison 136) may adjust at least one of: at least some of the first test data or at least some of the second test data. For instance, the adjustment may be based on a known relationship between the test condition(s) that is/are different and the test data, so as to compensate for the shift.

The second items may include all or less than all items that are associated with manufacturing data in the cluster. In some embodiments, the second items may include the first item. In order to understand this better, assume in these embodiments that during the testing of the first item, or after the testing is complete, test data of the first item may be stored in database element 140 (e.g. in test data database 146). Unless there is a conclusion that obtained first attribute data may not be true with respect to the first item, it may be presumed that obtained first attribute data is true and therefore test data of the first item may be associated with obtained first attribute data, e.g. in database element 140. Assume further, in these embodiments, that counterfeit determiner 130 may not have had available unique attribute data (e.g. obtained first attribute data that uniquely identifies a single item; e.g. attribute data traced, for instance by traceability element 132, from obtained first attribute data that uniquely identifies a single item; etc). Therefore, in these embodiments counterfeit determiner 130 (e.g. clustering analysis 134) may not have been able to able to separate out the unique attribute data from other attribute data in a group of attribute data associated with a cluster, and/or may not have been able to separate out manufacturing data in the cluster that includes the unique attribute data and/or that is associated with the unique attribute data, from other manufacturing data in the cluster. Thus, regardless of whether or not obtained first attribute data is true with respect to the first item, using attribute and/or other manufacturing data if no separating out has taken place, to obtain second test data, may cause the return (inter-alia) of first test data associated with the obtained first attribute data. Consequently the first test data may be included in the second test data (implying that the second items may include the first item in these embodiments).

In some embodiments, the second items may not include the first item, but may only include other items (or in other words may only include "reference items"). In some of these embodiments, the second items may include all items from the cluster other than the first item, but in some other of these embodiments, the second items may not necessarily include all items other than the first item from the cluster. For instance, in the latter embodiments not all items in the cluster may be included if the number of items in the cluster is too large.

In the illustrated embodiments, in stage 228, counterfeit determiner 130 (e.g. test comparison element 136) may compare the first test data to the second test data.

As mentioned above, it may be possible that the second test data may include first test data. For instance, this inclusion may occur if the second items include the first item, as explained above. In cases where the second test data may include first test data, the comparison of the first test data to the second test data may not be expected to lead to detection that the first item is counterfeit, even if the first item is counterfeit. If counterfeit determiner 130 has available unique attribute data (e.g. obtained first attribute data that uniquely identifies a single item; e.g. attribute data traced, for instance by traceability element 132, from obtained first attribute data that uniquely identifies a single item; etc.) then it may be possible to reduce the risk of not detecting that the first item is counterfeit, by ensuring that the first item is excluded from the second items (and therefore the second test data may not include first test data), and/or by ensuring that the second test data does not include test data for the first item, as described above. Additionally or alternatively, counterfeit determiner 130 (e.g. test comparison element 136) may be able to detect that it appears that the first test data is included in the second test data (e.g. if, against expectations, the first test data is completely identical to test data associated with a single item) and eliminate the test data that appears to be first test data from the second test data.

Additionally or alternatively, and specifically for cases when unique attribute data is not available and/or detection that the first test data is included in the second test data is not appropriate, it may be possible to reduce the risk of not detecting that the first item is counterfeit by ensuring that the second items only include non-counterfeit items (e.g. previously determined to not be counterfeit by method 200 and/or by other procedure(s)) so that the second test data may not include first test data unless the first item was in the past determined to not be counterfeit, and/or by ensuring that the second test data only include test data for non-counterfeit items and therefore not include the first test data unless the first item was in the past determined to not be counterfeit. Depending on the embodiment, repeated attempt(s) at determining whether or not a particular item is counterfeit, whether successful beforehand or not, may or may not be allowed by counterfeit determiner 130.

In some embodiments, where a cluster was defined and/or selected as described above, the test data of the reference items may not be expected to be fundamentally different from that of the first item. For instance, due to the definition and/or selection of the cluster, the reference items may be unlikely to experience a significant amount of normal process variation or be subjected to a major process excursion relative to the first item (under the assumption that obtained first attribute data is true with respect to the first item). Continuing with this instance, reference items may have attribute data conforming to second attribute data (that was provided based on obtained first attribute data) and/or may have manufacturing data (e.g. statistically manipulable manufacturing data) that is identical and/or similar to that of the first item. Because of conforming attribute data and/or sameness and/or similarity in manufacturing data (e.g. statistically manipulable manufacturing data), such reference items may be likely to have been manufactured (to date) under a matching manufacturing process, or in other words be members of the same manufacturing cluster, and therefore the reference items and first item should be expected to exhibit no fundamental difference in response under testing. The test data for the reference items may be expected to be similar to the first test data. Therefore any detected lack of similarity between the first test data and the second test data may indicate that the first item is counterfeit (and that the assumption that obtained first attribute data with respect to the first item is true may be incorrect).

In some embodiments, the actual number of second items and the amount of second test data obtained for these items may end up being severely limited. It is possible that at least part of stages 208 to 224 may need to be recursively repeated while allowing a larger dissimilarity between manufacturing data (e.g. statistically manipulable manufacturing data) within a manufacturing cluster (and therefore allowing larger clusters sizes) until a threshold is met (e.g. where the threshold may be met when a statistically viable sample size is reached for the second test data). The resulting (unintended) difference in manufacturing data (e.g. statistically manipulable manufacturing data) in a cluster may introduce a shift into the second test data with respect to the first test data. If the shift may not be avoided, then at least one of: some of the first test data or some of the second test data may need to be adjusted based on a known relationship between the manufacturing data (e.g. statistically manipulable manufacturing data) that is different in the cluster and the first and/or second test data, in order to compensate for the shift. For example, it may not be possible to match a manufacturing parameter like critical dimensions (CD) between the first item and the reference items. If a mismatch is unavoidable, the values for test parameters that depend on CD (like Frequency or Power) may be adjusted to compensate for the difference in CDs before the first test data and the second test data may be compared.

In some embodiments, when performing the comparison of first test data and second test data, the second test data may be treated as a statistical sample representing an actual population to which the first test data should belong. Therefore, a statistical analysis, such as calculation of the Mahalanobis distance between the first test data and the second test data, may be performed to estimate the likelihood that the first test data belongs to the population represented by second test data. Optionally, when the Mahalanobis distance is calculated, the Mahalanobis distance may be converted to a probability which may provide an alternative manner of estimating the likelihood that the first test data belongs to the population represented by second test data. The relationship between the Mahalanobis distance and the probability which allows conversion of the Mahalanobis distance to the probability is well known to those skilled in art.

The subject matter is not limited to utilizing the Mahalanobis distance, and any other procedure may be additionally or alternatively utilized. For example, in some embodiments any other multivariate outlier detection procedure may be additionally or alternatively utilized.

Depending on the embodiment, reduction of dimensionality of first and second test data may or may not be performed. In some embodiments, before estimating the likelihood that the first test data belongs to the population represented by second test data, the dimensionality of the first and second test data may be reduced. In order to achieve reduction of dimensionality, one or more of the following steps may be applied. First, the second test data may be transformed to a new set of uncorrelated variables, using orthogonalization. An example of orthogonalization is Principal Component Analysis or Robust Principal Component Analysis, where the resulting uncorrelated variables are known as Principal Components (PCs). The PCs may be ordered so that the first few retain most of the variation present in all of the original test values of the second test data. A subset of PCs may then be selected, which nevertheless may discard very little information. This subset may be selected, for example, by selecting a group of PCs so that the group of PCs contribute at least X % of the cumulative percentage of total variation. This group of PCs may be considered to be the subset of PCs referred to in the paragraph below, or further steps may be applied to obtain a subset of PCs. In these further steps, a gap may be searched for in the set of eigenvalues which correspond to the group of PCs. For example, there may be a gap between the mth and (m+1)th eigenvalues if the ratio of the eigenvalues is greater than 5. If such a gap exists, then all PCs from the beginning till the gap (for instance from the beginning until and including the mth PC) may be selected as the subset.

In these embodiments including reduction of dimensionality, first test data and second test data may be orthogonally projected onto the subspace spanned by the subset of PCs, in order to complete the reduction of dimensionality. It is noted that when the dimensionality of the first test data and second test data are reduced and/or other processing of the first and second test data takes place, the reduction and/or other processing may be considered to be performed as part of the comparison of the (obtained) first test data and second test data and therefore the result(s) may be considered to be result(s) of a comparison of the (obtained) first test data and second test data, just as in embodiments where no reduction of dimensionality/other processing takes place, the result(s) may be considered to be result(s) of a comparison of the (obtained) first test data and second test data.

In some embodiments, based on the results of the test data comparison in stage 228, counterfeit determiner (e.g. rules element 138) may apply rules relating to counterfeit detection of items. The rules that may be applied are not limited by the subject matter, but for the sake of further illustration to the reader, possible examples of rule application are described below with reference to stages 232 to 236.

In the illustrated embodiments, in stage 232, counterfeit determiner 130 (e.g. rules element 138), may determine whether or not the first item is counterfeit based on at least one result of the comparison in stage 228. For instance, counterfeit determiner 130 may determine whether or not the obtained first attribute data is true with respect to the first item based on result(s) of the comparing.

The subject matter does not limit how it may be determined whether or not the first item is counterfeit based on result(s) of the comparison but for the sake of further illustration to the reader some examples are now provided.

In some examples, how it may be determined whether or not the first item is counterfeit based on result(s) of the comparison may be in accordance with rules.

Additionally or alternatively, in some examples, counterfeit determiner 130 may in stage 232 compare the Mahalanobis distance or the probability (either of which may be considered to be a result of the comparison of stage 228), to a respective threshold, in order to determine whether or not the first item is counterfeit. For instance, it may be determined that the first item is counterfeit, if the probability is below the threshold. In some cases, as commonly practiced, statistical considerations such as sample size, variability, confidence intervals, etc. may be utilized to interpret the resulting probability data. The threshold may be constant or adjustable, for instance adjustable based on defectivity in a given batch (i.e. fraction of items in a given batch determined to be counterfeit).

Additionally or alternatively, in some examples counterfeit determiner 130 may in stage 232 utilize a machine leaning technique to improve performance based on historical results of the statistical analysis. For instance, counterfeit determiner may use a control chart of the Mahalanobis distance to quantify how unusual the Mahalanobis distance (a result of the comparison in stage 228) is, compared to its historical baseline. Continuing with this instance, the information obtained from the control chart may be used in determining whether or not the relationship between the first test data and the second test data (e.g. as represented by the Mahalanobis distance, or otherwise) is an outlier. The information about the relationship being an outlier may indicate that the first test data is more different from the second test data than what was historically observed. This information about the relationship being an outlier may be used in conjunction with other information (e.g. interpretation of the probability associated with the actual Mahalanobis distance), or instead of other information.

In some embodiments, method 200 may end for the first item after it is determined in stage 232 whether or not the first item is counterfeit. For instance, counterfeit determiner may not perform one or more act(s) consequent to the determination in stage 232 of whether or not the first item is counterfeit. This non-performance of act(s) may be due to rules. Continuing with this instance, in some cases if the first item is determined to not be counterfeit, then subsequent processing of the first item (e.g. during manufacturing, during in-use) may proceed without change (e.g. as though method 200 had not taken place). Continuing with this instance, in some cases, whether or not the first item is determined to be counterfeit, the first item may not be treated differently than items that were not detected to be counterfeit (and/or may not be treated differently than if the first item were not detected to be counterfeit).

However, in the illustrated embodiments, method 200 may not end with method 232 but may proceed to stage 236. In the illustrated embodiments, in stage 236, counterfeit determiner 130 (e.g. rules element) may perform at least one act consequent to the determination in stage 232 of whether or not the first item is counterfeit.

In some embodiments, the performance of at least one act may be due to rules.

In some embodiments performance of an act by counterfeit determiner 130 (e.g. rules element) may include performance of an action and/or initiation of an action. Initiation of an action may include, for instance, generating an indication of an action and/or generating a trigger for an action. The initiated action may, for example, be performed elsewhere than counterfeit determiner 130 such as by tester 110, elsewhere in system 100, and/or external to system 100.

Action(s) that may be performed in some embodiments consequent to a determination that the first item is not counterfeit are not limited by the subject matter. However for the sake of further illustration to the reader, the following examples are now provided. For example, action(s) may include workflow modification for the item and/or for one or more other items. Workflow modification may include one or more of the following instances. For instance, manufacturing data (e.g. attribute manufacturing data and/or non-attribute manufacturing data) may be augmented for the first item and/or other items in a given batch that includes the first item, e.g. to indicate that the first item was determined to not be counterfeit. For another instance, manufacturing flow(s) for the first item and/or other items in the given batch may be modified. For another instance, workflow related information for the first item and/or other items in the given batch may be changed, e.g. if the original workflow was for counterfeit items. For another instance, a determination about the quality of the first item and/or other items in the given batch may be changed, e.g. a quality index may be upgraded for the first item and/or for other items in the given batch. For another instance, the first item and/or other items in the given batch may be released from being on hold subject to counterfeit evaluation of the first item. For another instance, the first item and/or other items in the given batch may be used in a different product line than if the first item had been determined to be counterfeit. For another instance, fewer tests may be run on the first item and/or other items in the given batch, for instance eliminating as part of test time reduction (TTR) individual test or test steps that were to run if the first item had been determined to be counterfeit. For another instance, a report may be issued (e.g. a notification sent) regarding the first item being determined to not be counterfeit. The subject matter does not limit the meaning of workflow, but in some embodiments a workflow may include a sequence of industrial, administrative, data collection and/or other processes through which an item may pass from initiation to completion of manufacturing flow(s) involving the item. For another example, the workflow related information for the first item and/or other items in the given batch may be maintained and/or confirmed.

Action(s) that may be performed in some embodiments consequent to a determination that the first item is counterfeit are not limited by the subject matter. However for the sake of further illustration to the reader, the following examples are now provided. For example, action(s) may include workflow modification for the item and/or for one or more other items. Workflow modification may include one or more of the following instances. For instance, manufacturing data (e.g. attribute manufacturing data and/or non-attribute manufacturing data) may be augmented for the first item and/or other items in a given batch that includes the first item, e.g. to indicate that the first item was determined to be counterfeit. For another instance, manufacturing flow(s) for the first item and/or other items in the given batch may be modified. For another instance, the workflow related information for the first item and/or other items in the given batch may be changed, e.g. if the original workflow was for non-counterfeit items. For another instance, a determination about the quality of the first item and/or other items in the given batch may be changed, e.g. a quality index may be downgraded for the first item and/or for other items in the given batch. For another instance, the first item and/or other items in the given batch may be placed on hold. For another instance, the first item and/or other items in the given batch may be used in a different product line than if the first item had been determined to not be counterfeit. For another instance, more tests may be run on the first item and/or other items in the given batch, for instance adding individual test or test steps to further investigate the item. For another instance, the first item and/or other items in the given batch may be sent to a laboratory for further investigation. For another instance, additional procedures may be performed to try to otherwise find the first item to not be counterfeit. For another instance, method 200 may be repeated in order to try again to find the first item to not be counterfeit. For another instance, a report may be issued (e.g. a notification sent) regarding the first item being determined to be counterfeit. For another example, the workflow related information for the first item and/or other items in the given batch may be maintained and/or confirmed.

Depending on the action initiated as a result of determining that the first item is counterfeit or not counterfeit, an indication of action and/or a trigger to perform an action may or may not be provided from counterfeit determiner 130 (e.g. rules element 138) to tester operating system 112 in stage 236. For instance, if tester 110 would be performing the action, then an indication and/or trigger may be provided to tester operating system 112, but if tester 110 would not be performing the action then an indication and/or trigger may not be provided to tester operating system 112. Continuing with this instance, if tests are to be added and/or eliminated during real time, tester 110 may be performing the addition and/or elimination and therefore an indication and/or trigger may be provided to tester operating system 112.

In the illustrated embodiments method 200 may end for the first item. In some embodiments, method 200 may then be repeated for the same first item or for a different item (which would then be considered to be the first item). Although method 200 is described herein with reference to one item, a first item, it is possible that in some embodiments method 200 may be performed for more than one item (each considered a "first item") in parallel.

In some embodiments, stages which are shown as being executed sequentially in FIG. 2 may be executed in parallel. In some embodiments, stages may be executed in a different order than illustrated in FIG. 2. In some embodiments, method 200 may include more, fewer and/or different stages than illustrated in FIG. 2. In some embodiments, one or more stages of method 200 may be performed by one or more other element(s) that may be included in system 100 and/or may not be included in system 100, in addition to or instead of counterfeit determiner 130. In some embodiments, a stage attributed to a particular element in counterfeit determiner 130, may additionally or alternatively be performed by one or more other elements in counterfeit determiner 130 and/or one or more elements not in counterfeit determiner 130.

In some embodiments, system 100 and method 200 may be adapted to perform one or more other procedure(s) for counterfeit detection, in addition to using the result(s) of the comparing. Such procedure(s) may include the use of results of counterfeit detection for other items. For instance, if a fraction of items in a given batch that were (already) determined to be counterfeit (e.g. using method 200) is over a threshold, then the first item (included in the given batch) may be determined to be counterfeit. Such procedure(s) may additionally or alternatively include use of one or more of the approaches known in the art, some of which were discussed above in the background section as existing approaches. In these embodiments, stage(s) illustrated in FIG. 2 (such as stages 204 to 228) may be performed and other procedure(s) may be performed. In these embodiments, the determination in stage 232 of whether or not the first item is counterfeit, may be based solely on at least one result of the comparing, or may be based on at least one result of the comparing in conjunction with result(s) from the other performed procedure(s). For example, if based on at least one result of the comparing and on result(s) from other performed procedure(s) may lead to different outcomes regarding whether or not the first item is counterfeit, then depending on the embodiment, any procedure for reconciling the outcomes and/or prioritizing the outcomes may be applied (e.g. rule(s) applying). In some cases, the determination in stage 232 may be based on at least one result of the comparing, and on a fraction of items in a given batch determined to be counterfeit (i.e. defectivity in a given batch). In these cases, if the defectivity in a given batch determined to be counterfeit is over a threshold, then the first item may be determined to be counterfeit even if the result(s) of the comparison may not be sufficient to allow a determination of whether or not the item is counterfeit solely on its basis.

In some embodiments, the presently disclosed subject matter may include one or more advantages. For instance, a first advantage may be that in some of these embodiments the subject matter may include analysis of large suites of multidimensional test and manufacturing data. Recent advances in computational statistics, in particular in multivariate methods, have made it possible to quickly process large amounts of multidimensional data in order to enable implementation of the subject matter in a high volume manufacturing supply chain.

A second advantage may be that in some embodiments, the subject matter may not necessarily rely for counterfeit detection on a unit-level ID, and may not be limited to scope of a single PUF, to a single test outcome, and/or to a single known non-counterfeit unit. For instance, the subject matter may not have the problem(s) of counterfeit detection based on unit-level ID. Continuing with this instance, one problem with relying on a unit level ID may be that there may be many items that may not have a unit level-ID due to technical difficulties and/or cost reasons. Moreover, an item (e.g. a module or end-user device) that includes a plurality of items may require unit level IDs for the item itself as well as for each item included therein, which may amplify the problem(s) of relying on unit level IDs. Additionally or alternatively, counterfeit detection that relies on a unit-level ID may be defeated by counterfeiters who may be capable of generating a fake unit-level ID that would match an existing format and therefore pass counterfeit detection attempts of the unit-level ID.

With regard to a PUF, for instance, the subject matter may not have the problem(s) of counterfeit detection based on a PUF. Continuing with this instance, one problem with PUF's is that even though these functions are called "physically unclonable" there have been numerous reports about technologies available for matching the response for items. Second, the susceptibility of a PUF to cloning may stem from the intrinsic connection of the PUF to particular physical elements within an item. Therefore counterfeiting may be successful even if limited to reproducing the response of just those physical elements of the item, without necessarily having to match the entirety of behavior of the item. Third, an item (e.g. a module or end-user device) that includes a plurality of items may require PUFs for the item itself as well as for each item included therein, which may amplify the problem(s) of counterfeit detection based on a PUF.

With regard to a single test outcome, for instance, the subject matter may not have the problem(s) of counterfeit detection based on a single test outcome. Continuing with this instance, there may be problems with relying on a single test outcome that may be similar to the problems of relying on a PUF. Namely, relying on output from a single test may allow a counterfeiter to successfully counterfeit the item since the scope of the counterfeiter is limited to reproducing the output from a single test. In addition or alternatively, there may not be a single test that may be relied upon to detect all counterfeit items. The items themselves may be different, the uses of the items may be varied, and, therefore the test plan for each item may be customized, making high volume manufacturing, if desired, unlikely to be appropriate.

With regard to comparing to a single known non-counterfeit unit, for instance, the subject matter may not have the problem(s) of counterfeit detection based on a single known non-counterfeit unit. Continuing with this instance, the problem with relying on a single known non-counterfeit unit is that variation between manufacture of the item being tested and manufacture of the known non-counterfeit unit (to date) may introduce enough difference into the test data so the item may be detected as counterfeit even if the item is not counterfeit.

A third advantage of the subject matter may be that in some embodiments, the subject matter may take into account normal process variation and not (blindly) compare items from a given batch which may possibly have normal process variation. Under such a blind comparison, counterfeit items may not be detected if the given batch includes items that were manufactured (up to that point) differently. It is also possible that counterfeit detection that blindly compares items from a given batch may not work if a large fraction of the current batch is counterfeit (i.e. if there is a large defectivity in a given batch). It may be sufficiently likely that a given batch which includes one counterfeit item may include a large fraction of counterfeit items.

Other advantages of the subject matter may be apparent from the description above.

It will be understood that the subject matter contemplates, for example, a computer program being readable by a computer for executing any method or any part of any method disclosed herein. Further contemplated by the subject matter, for example, is a computer-readable medium tangibly embodying program code readable by a computer for executing any method or any part of any method disclosed herein.

While examples of the subject matter have been shown and described, the subject matter is not thus limited. Numerous modifications, changes and improvements within the scope of the subject matter will now occur to the reader.

The invention claimed is:

1. A counterfeit detection system, comprising at least one hardware processor, the at least one hardware processor configured to:
provide second attribute data that is based on first attribute data obtained for a first electronic item;
obtain fabrication data for electronic items including the first electronic item, wherein the fabrication data are associated with the second attribute data, and wherein the fabrication data are different from the second attribute data, and wherein the fabrication data comprise at least one of data collected for a fabrication step and data generated for a fabrication step;
statistically cluster the obtained fabrication data into at least two clusters;
select a cluster from the at least two clusters based on at least one of (i) the fabrication data obtained for the first electronic item and (ii) the first attribute data of the first electronic item;
obtain first test data for the first item, wherein the first test data are associated with a plurality of tests of the first item;
obtain second test data for second electronic items associated with fabrication data in the selected cluster, the second test data being associated with second tests of the second items, wherein the second tests are comparable to the plurality of tests of the first item;
statistically compare the first test data to the second test data;

determine whether the first item is counterfeit, or not counterfeit, based on at least one result of the comparing.

2. The system of claim 1, further comprising at least one database stored on a non-transitory computer readable memory, wherein at least some obtained fabrication data is obtained from the at least one database.

3. The system of claim 2, wherein at least some of at least one of: the first test data or the second test data is obtained from the at least one database.

4. The system of claim 1, further comprising at least one tester, wherein the at least one hardware processor is included in at least one of: at least one computer that is part of at least one of the at least one tester, or at least one computer that is not part of any tester.

5. The system of claim 4, wherein at least some of at least one of: the first test data or the second test data is obtained from the at least one tester.

6. The system of claim 4, wherein the at least one tester includes at least one manufacturing tester.

7. The system of claim 6, wherein the hardware processor being configured to determine whether the first item is counterfeit, or not counterfeit, includes the hardware processor being configured to determine while the first item, or another item including the first item, is electrically coupled to at least one of the at least one manufacturing tester during manufacturing of the first item or manufacturing of the another item.

8. The system of claim 4, wherein the at least one tester includes at least one of: at least one Built In Self Test structure for in-use testing or at least another test structure for in-use testing.

9. The system of claim 1, wherein the hardware processor being configured to select a cluster includes the hardware processor being configured to look up unique attribute data in one or more groups of attribute data respectively associated with the one or more clusters, to determine which group includes the unique attribute data, wherein the unique attribute data includes at least one of: obtained first attribute data that uniquely identifies a single item or attribute data traced from obtained first attribute data that uniquely identifies a single item.

10. The system of claim 1, wherein the hardware processor being configured to statistically cluster the obtained fabrication data includes the hardware processor being configured to develop a statistical model for the clustering, and wherein the being configured to select a cluster includes being configured to apply the statistical model to obtained fabrication data associated with obtained first attribute data.

11. The system of claim 1, wherein the hardware processor is further configured to adjust for variation in test conditions of at least one of: at least some of the first test data or at least some of the second test data.

12. The system of claim 1, wherein the first test data and the second test data both include only passing test data.

13. The method of claim 1, wherein the obtained fabrication data includes critical manufacturing data.

14. The system of claim 1, wherein the obtained fabrication data includes all obtainable fabrication data associated with the second attribute data.

15. The system of claim 1, wherein when a quantity of the second items is below a threshold, the at least one hardware processor is further configured to repeat clustering with larger cluster sizes until the threshold is met.

16. The system of claim 1, wherein the hardware processor is further configured to adjust at least one of: at least some of the first test data or at least some of the second test data, based on a known relationship between fabrication data that is different in the cluster and the first test data or the second test data.

17. The system of claim 1, wherein the hardware processor being configured to compare includes the hardware processor being configured to perform a multivariate outlier detection.

18. The system of claim 17, wherein the hardware processor being configured to perform a multivariate outlier detection includes the hardware processor being configured to calculate a Mahalanobis distance between the first test data and the second test data.

19. The system of claim 18, wherein the hardware processor being configured to determine whether the first item is counterfeit, or not counterfeit, includes the hardware processor being configured to compare the distance to a threshold.

20. The system of claim 18, wherein the hardware processor being configured to determine whether first item is counterfeit, or not counterfeit, includes the hardware processor being configured to compare the distance to a historical baseline.

21. The system of claim 1, wherein the hardware processor being configured to statistically compare includes the hardware processor being configured to reduce a dimensionality of the second test data and the first test data.

22. The system of claim 1, wherein the plurality of tests includes at least one of: all of the tests performed during at least one testing sub-step, or all of the tests performed during at least one in-use testing instance.

23. The system of claim 1, wherein the first test data includes critical test data.

24. The system of claim 1, wherein the first test data includes at least one of: test results, virtual test data, or test meta data.

25. The system of claim 1, wherein the first attribute data includes attribute data that uniquely identifies a single item.

26. The system of claim 1, wherein the first attribute data is based on incoming batch information.

27. The system of claim 1, wherein the hardware processor is further configured to perform at least one act including at least one of: being configured to perform or being configured to initiate at least one workflow modification.

28. The system of claim 1, wherein the at least one hardware processor is further configured to trace data.

29. A method of counterfeit detection, comprising, performing by a hardware processor the steps of:
providing second attribute data that is based on first attribute data obtained for a first electronic item;
obtaining fabrication data for electronic items including the first electronic item, wherein the fabrication data are associated with the second attribute data, and wherein the fabrication data are different from the second attribute data, and wherein the fabrication data comprise at least one of data collected for a fabrication step and data generated for a fabrication step;
statistically clustering the obtained fabrication data into at least two clusters;
selecting a cluster from the at least two clusters based on at least one of (i) the fabrication data obtained for the first electronic item and (ii) the first attribute data of the first electronic item;
obtaining first test data for the first item, wherein the first test data are associated with a plurality of tests of the first item;
obtaining second test data for second electronic items associated with fabrication data in the selected cluster, the second test data being associated with second tests of the second items, and wherein the second tests are comparable to the plurality of tests of the first item;

statistically comparing the first test data to the second test data;

determining whether the first item is counterfeit, or not counterfeit, based on at least one result of the comparing.

30. A non-transitory computer readable medium having a computer readable program code embodied therein, the computer readable program code configured to be executed to perform a method of counterfeit detection, comprising:

providing second attribute data that is based on first attribute data obtained for a first electronic item;

obtaining fabrication data of electronic items including the first electronic item, wherein the fabrication data are associated with the second attribute data, and wherein the fabrication data are different from the second attribute data, and wherein the fabrication data comprise at least one of data collected for a fabrication step and data generated for a fabrication step;

statistically clustering the obtained fabrication data into at least two clusters;

selecting a cluster from the at least two clusters based on at least one of (i) the fabrication data obtained for the first electronic item and (ii) the first attribute data of the first electronic item;

obtaining first test data for the first item, wherein the first test data are associated with a plurality of tests of the first item;

obtaining second test data for second electronic items associated with fabrication data in the selected cluster, the second test data being associated with second tests of the second items, and wherein the second tests are comparable to the plurality of tests of the first item;

statistically comparing the first test data to the second test data;

determining whether the first item is counterfeit, or not counterfeit, based on at least one result of the comparing.

* * * * *